(12) United States Patent
Berger et al.

(10) Patent No.: US 11,866,119 B2
(45) Date of Patent: Jan. 9, 2024

(54) AUTOMATIC MOTORCYCLE FORK SUPPRESSION SYSTEM

(71) Applicant: Brant William Berger, Morro Bay, CA (US)

(72) Inventors: Brant William Berger, Morro Bay, CA (US); Gary Allen Brunkenhoefer, Templeton, CA (US)

(73) Assignee: Brant William Berger, Morro Bay, CA (US)

( * ) Notice: Subject to any disclaimer, the term of this patent is extended or adjusted under 35 U.S.C. 154(b) by 407 days.

(21) Appl. No.: 17/145,128

(22) Filed: Jan. 8, 2021

(65) Prior Publication Data

US 2021/0214039 A1    Jul. 15, 2021

Related U.S. Application Data

(60) Provisional application No. 62/995,122, filed on Jan. 14, 2020.

(51) Int. Cl.
*B62K 25/06*     (2006.01)
*B62K 25/04*     (2006.01)

(52) U.S. Cl.
CPC ........ *B62K 25/06* (2013.01); *B62K 2025/047* (2013.01)

(58) Field of Classification Search
CPC .. B62K 25/06; B62K 25/08; B62K 2025/047; F16F 9/56; F16F 9/54; F16F 2230/0005; B60N 2/231

USPC ......................................................... 188/300
See application file for complete search history.

(56) References Cited

U.S. PATENT DOCUMENTS

| | | | | |
|---|---|---|---|---|
| 9,855,988 B2* | 1/2018 | DeVol | ..................... | B62K 25/04 |
| 2012/0292148 A1* | 11/2012 | Phipps | ....................... | F16F 9/56 |
| | | | | 188/300 |
| 2013/0187315 A1* | 7/2013 | Kull | ....................... | F16F 9/0254 |
| | | | | 267/120 |
| 2014/0360827 A1* | 12/2014 | Phipps | ................... | B62K 25/08 |
| | | | | 188/300 |
| 2016/0144926 A1* | 5/2016 | DeVol | ................... | B62K 25/04 |
| | | | | 280/288.4 |

* cited by examiner

*Primary Examiner* — Robert A. Siconolfi
*Assistant Examiner* — San M Aung
(74) *Attorney, Agent, or Firm* — Fitch, Even, Tabin & Flannery LLP

(57) ABSTRACT

An automatic fork suppression system is described. The automatic fork suppression system includes a fork ring coupled to an upper fork tube and a locking assembly coupled to an outer face of a fork guard. The locking assembly includes a body, a latch lever, a pivot pin, a locking mechanism, and a lever return mechanism. In an unlocked position, the catch of the latch lever is configured inside the body of the locking assembly and is not engaged with an engagement portion of the fork ring). In a locked position, a catch of the latch lever is configured outside the body of the locking assembly and is engaged with an engagement portion of the fork ring. When the latch lever is coupled to the body, the handle extends through an opening such that it is accessible (e.g., by a user or motorcycle rider) and movable between unlocked and armed positions.

16 Claims, 20 Drawing Sheets

AUTOMATIC MOTORCYCLE FORK SUPPRESSION SYSTEM

This application claims the benefit of U.S. Provisional Application No. 62/995,122, filed Jan. 14, 2020, for AUTOMATIC FORK SUPPRESSION DEVICE, which is incorporated in its entirety herein by reference.

BACKGROUND OF THE INVENTION

1. Field of the Invention

The present invention relates generally to suppression systems, and more specifically to an automatic fork suppression system for a motorcycle.

2. Discussion of the Related Art

Various systems and processes are known in the art for an automatic fork suppression system for a motorcycle.

A motorcycle fork connects a motorcycle's front wheel and axle to the motorcycle's frame (e.g., to create a steering axis). The fork and the attachment of the fork to the frame may impact how a motorcycle handles and dives (e.g., during breaking). A fork suppression device is used to lower the front end of a motorcycle to allow it to launch at a faster rate without pulling up. A rider suppresses the fork (e.g., compresses the fork suspension) and a catch or pin is manually engaged to lock it. Conventional fork suppression devices may require the help of a second person in order to lower and lock the front end of the motorcycle.

SUMMARY

An apparatus, system, and method for an automatic fork suppression system for a motorcycle are described. Embodiments of the apparatus, system, and method include a fork ring coupled to a fork tube of the motorcycle and a locking assembly coupled to a fork guard of the motorcycle such that a portion of the locking assembly may pass through the fork guard, wherein the locking assembly is in spaced relationship to the fork ring, the locking assembly comprising a body configured to couple to the fork guard; a latch lever movably coupled to the body and including a first end having a handle and a second end having a catch, wherein the latch lever is coupled to the body such that the latch lever is movable between an unlocked position, an armed position, and an engaged position, the spaced relationship further comprising the catch being engaged by an engagement portion of the fork ring when the latch lever is in the armed position and the fork ring moves below the catch and subsequently moves upwards; a lever return mechanism configured to automatically restore the latch lever to the unlocked position; and a locking mechanism configured to resist the automatic restoring of the latch lever to the unlocked position when the latch lever is in the armed position, wherein when the latch lever is moves from the unlocked position to the armed position the latch lever is maintained in the armed position prior to engagement by the fork ring.

A method, apparatus, and system for an automatic fork suppression system for a motorcycle are described. Embodiments of the method, apparatus, and system are configured to move a handle of the locking assembly from an unlocked position to an armed position while the fork ring is located above the locking assembly, wherein a catch of a latch lever of the locking assembly moves from an unlocked position to an armed position, move of the fork ring downward past the catch, move of the fork ring upwards subsequent to moving the fork ring downward past the catch, wherein the catch is engaged by the fork ring, wherein further upward movement of the fork tube is suppressed, move of the fork ring downwards subsequent to moving the fork ring upwards, wherein the catch is disengaged by the fork ring, and return of the latch lever to the unlocked position automatically as a result of the catch disengaging from the fork ring.

A method, apparatus, system for an automatic fork suppression system for a motorcycle are described. Embodiments of the method, apparatus, and system are configured to provide a hole in the fork guard, couple a lock assembly to the fork guard, wherein the lock assembly comprises a body and a latch lever pivotably coupled to the body such that the latch lever is movable between an unlocked position and an armed position, the latch lever coupled to a locking mechanism and having a catch at a first end of the latch lever and a handle at a second end of the latch lever, wherein the lock assembly is coupled to the fork guard such that the fork guard hole allows pass-through of the catch of the lock latch lever, and couple a fork ring to the upper fork tube, the fork ring having an engagement portion configured to engage with the catch when the latch lever is in the armed position, wherein the coupling includes locating the engagement portion in spaced relationship to the latch lever such that the catch in the armed position engages with the engagement portion when the fork ring moves upwards from a position below the catch.

DETAILED DESCRIPTION

Figure 1:
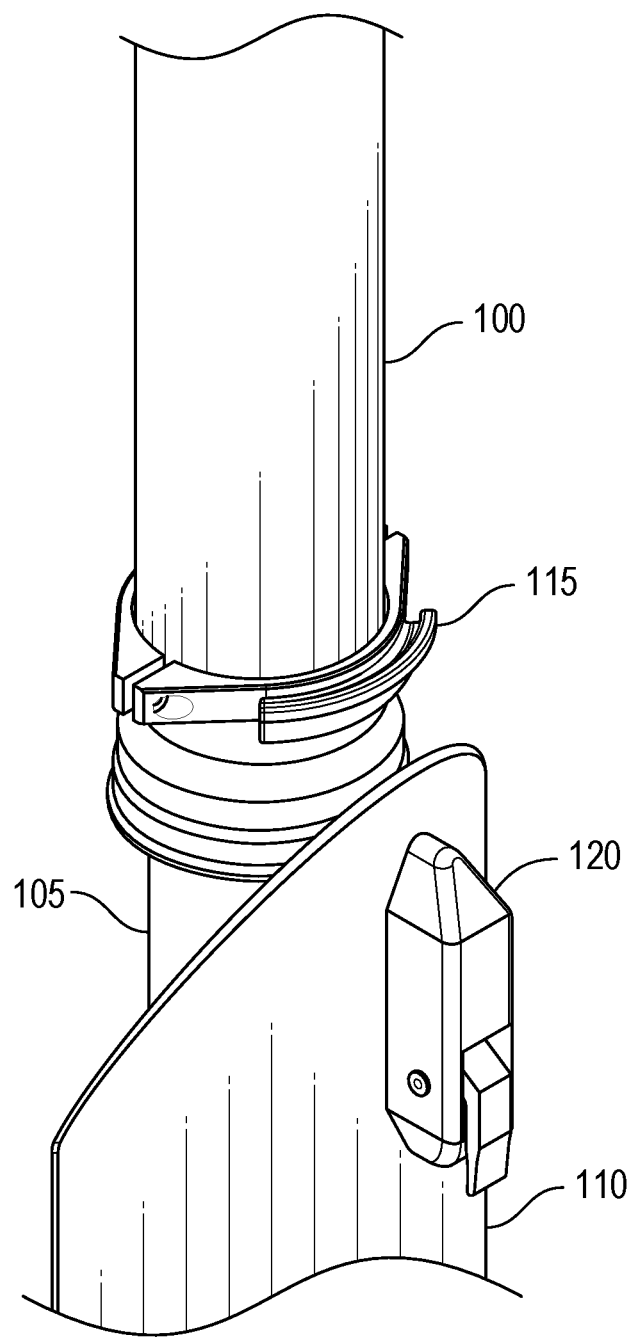
FIG. 1 shows an example of an automatic for suppression system according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As described herein, a motorcycle fork connects a motorcycle's front wheel and axle to the motorcycle's frame (e.g., to create a steering axis). The fork and the attachment of the fork to the frame may impact how a motorcycle handles and dives (e.g., during braking). A fork may include an upper fork tube and a lower fork tube, where the upper fork tube and the lower fork tube share a longitudinal axis and one tube fits within the other tube such that the length of the fork tube (e.g., the length of the total upper fork tube and lower fork tube together) changes due to sliding of the one fork tube inside the other tube.

A fork suppression device is used to lower the front end of a motorcycle to allow it to launch at a faster rate without pulling up. A rider suppresses the fork (e.g., compresses the fork suspension) and a catch or pin is manually engaged to lock it. Conventional fork suppression devices may require the help of a second person in order to lower and lock the front end of the motorcycle.

The automatic fork suppression system described herein allows a user (e.g., a motorcycle rider) to suppress the forks of the motorcycle without requiring the help of a second person. The automatic fork suppression system described herein may also eliminate the need to suppress the forks of the motorcycle manually. This gives the rider the freedom and ease of using the automatic fork suppression system anytime even when no one is around or available.

The automatic fork suppression system described herein includes a fork ring coupled to an upper fork tube and a locking assembly coupled to an outer face of a fork guard. The locking assembly includes a body, a latch lever, a pivot pin, a locking mechanism, and a lever return mechanism. In an unlocked position, the catch of the latch lever is configured inside the body of the locking assembly and is not engaged with an engagement portion of the fork ring). In a locked position, a catch of the latch lever is configured outside the body of the locking assembly and is engaged with an engagement portion of the fork ring.

As described herein, when the latch lever is coupled to the body, the handle extends through an opening such that it is accessible (e.g., by a rider of the motorcycle) and movable between the unlocked and armed positions. The catch is extended through the opening such that it is engageable by the fork ring and movable between the unlocked, armed, and engaged positions. The lever return mechanism (e.g., a coiled spring, a flat spring, magnets, etc.) is configured to automatically move the lever from the engaged position where the catch is engaged with the fork ring to the original unlocked position when the catch is released from the fork ring due to downward movement of the fork ring.

FIG. 1 shows an example of an automatic for suppression system according to aspects of the present disclosure. The example shown includes upper fork tube 100, lower fork tube 105, fork guard 110, fork ring 115, and locking assembly 120.

The automatic fork suppression system shown in FIG. 1 may be installed on a motorcycle fork. Shown is a portion of a fork tube on one side of the fork. The fork tube comprises an upper fork tube 100 and a lower fork tube 105. The upper fork tube 100 and the lower fork tube 105 share a longitudinal axis and one tube fits within the other tube such that the length of the fork tube (e.g., the length of the total upper fork tube 100 and lower fork tube 105 together) changes due to sliding of the one fork tube inside the other tube. In a motorcycle embodiment shown in FIG. 1, the lower fork tube 105 fits within the upper fork tube 100. A fork guard 110 is installed on the lower fork tube 105 and is stationary with respect to the lower fork tube 105 (e.g., the upper fork tube 100 moves up and down with respect to the fork guard 110 and the lower fork tube 105).

The automatic fork suppression system comprises the fork ring 115 and the locking assembly 120. The fork ring 115 is coupled to the upper fork tube 100 and the locking assembly 120 is coupled to an outer face of the fork guard 110. The fork guard 110 is further configured such that a portion of the locking assembly 120 passes through the fork guard 110.

Upper fork tube 100 is an example of, or includes aspects of, the corresponding element described with reference to FIGS. 6-10. Lower fork tube 105 is an example of, or includes aspects of, the corresponding element described with reference to FIGS. 7-10. Fork guard 110 is an example of, or includes aspects of, the corresponding element described with reference to FIGS. 6-10. According to some embodiments, fork ring 115 may be coupled to a fork tube of the motorcycle. In some examples, the fork ring 115 is configured to encircle the fork tube. Fork ring 115 is an example of, or includes aspects of, the corresponding element described with reference to FIGS. 2, and 6-11.

According to some embodiments, locking assembly 120 may be coupled to a fork guard 110 of the motorcycle such that a portion of the locking assembly 120 may pass through the fork guard 110, wherein the locking assembly 120 is in spaced relationship to the fork ring 115. The locking assembly 120 may include a body configured to couple to the fork guard 110. The locking assembly 120 may include a latch lever movably coupled to the body and including a first end having a handle and a second end having a catch, where the latch lever is coupled to the body such that the latch lever is movable between an unlocked position, an armed position, and an engaged position. The spaced relationship may further include the catch being engaged by an engagement portion of the fork ring 115 when the latch lever is in the armed position and the fork ring 115 moves below the catch and subsequently moves upwards. The locking assembly 120 may include a lever return mechanism configured to automatically restore the latch lever to the unlocked position. The locking assembly 120 may include a locking mechanism configured to resist the automatic restoring of the latch lever to the unlocked position when the latch lever is in the armed position, wherein when the latch lever is moves from the unlocked position to the armed position the latch lever is maintained in the armed position prior to engagement by the fork ring 115. In some examples, the body is configured to couple to an outer surface of the fork guard 110.

Locking assembly 120 is an example of, or includes aspects of, the corresponding element described with reference to FIGS. 3-10, and 12-18.

Figure 2:
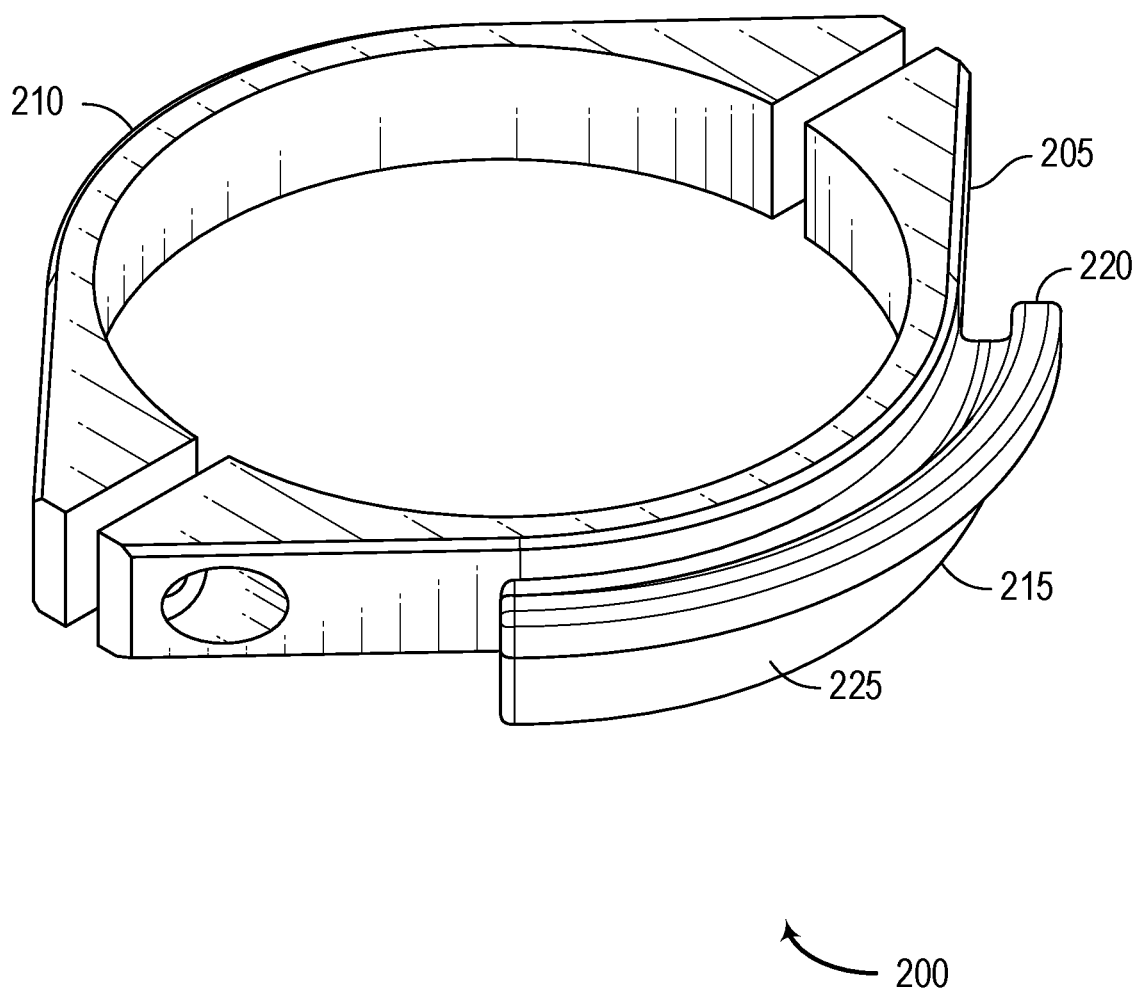
FIG. 2 shows an example of a fork ring according to aspects of the present disclosure.

FIG. 2 shows an example of a fork ring 200 according to aspects of the present disclosure.

The fork ring 200 of FIG. 2 comprises a generally semi-circular front segment 205 and a generally semi-circular rear segment 210. When the front segment 205 is coupled to the rear segment 210 around the upper fork tube, the fork ring 200 is configured to encircle the upper fork tube. The front segment 205 of the fork ring 200 includes an engagement portion 215 located in a position to engage a catch of the locking assembly. The engagement portion 215 may be configured to engage a catch of the locking assembly (e.g., as described in more detail herein, for example, with reference to FIG. 9). In the embodiment shown in FIG. 2, the ends of the semi-circular segments (e.g., the ends of the front segment 205 and the rear segment 210) are each removably coupled together using a threaded fastener. In other embodiments the fork ring 200 may be a single split ring. The fork ring 200 is installed on the upper fork tube such that the engagement portion 215 is proximate to the fork guard.

The engagement portion 215 includes a continuous lip 220. Below the lip 220, the engagement portion 215 includes a sloped surface 225 that slopes downwards and inwards away from the lip 220. In the embodiment shown in FIG. 2, the lip 220 is curved. In some embodiments the lip 220 extends for the entire extent (e.g., the entire surface) of the engagement portion 215. In some embodiments, the engagement portion 215 extends for an arc of approximately 90 degrees. In some embodiments, the engagement portion 215 extends for an arc of between 85 and 95 degrees. In other embodiments the engagement portion 215 extends for an arc of less than 85 degrees. In other embodiments the engagement portion 215 extends for an arc of between 5 and 30 degrees.

Fork ring 200 is an example of, or includes aspects of, the corresponding element described with reference to FIGS. 1, and 6-11. In one embodiment, fork ring 200 includes front segment 205, rear segment 210, and engagement portion 215. Front segment 205 is an example of, or includes aspects of, the corresponding element described with reference to FIGS. 6 and 11. Rear segment 210 is an example of, or includes aspects of, the corresponding element described with reference to FIGS. 6 and 11.

Engagement portion 215 is an example of, or includes aspects of, the corresponding element described with reference to FIGS. 6-9, and 11. In one embodiment, engagement portion 215 includes lip 220 and sloped surface 225. Lip 220 is an example of, or includes aspects of, the corresponding element described with reference to FIGS. 7-9, and 11. Sloped surface 225 is an example of, or includes aspects of, the corresponding element described with reference to FIG. 11.

Figure 3:
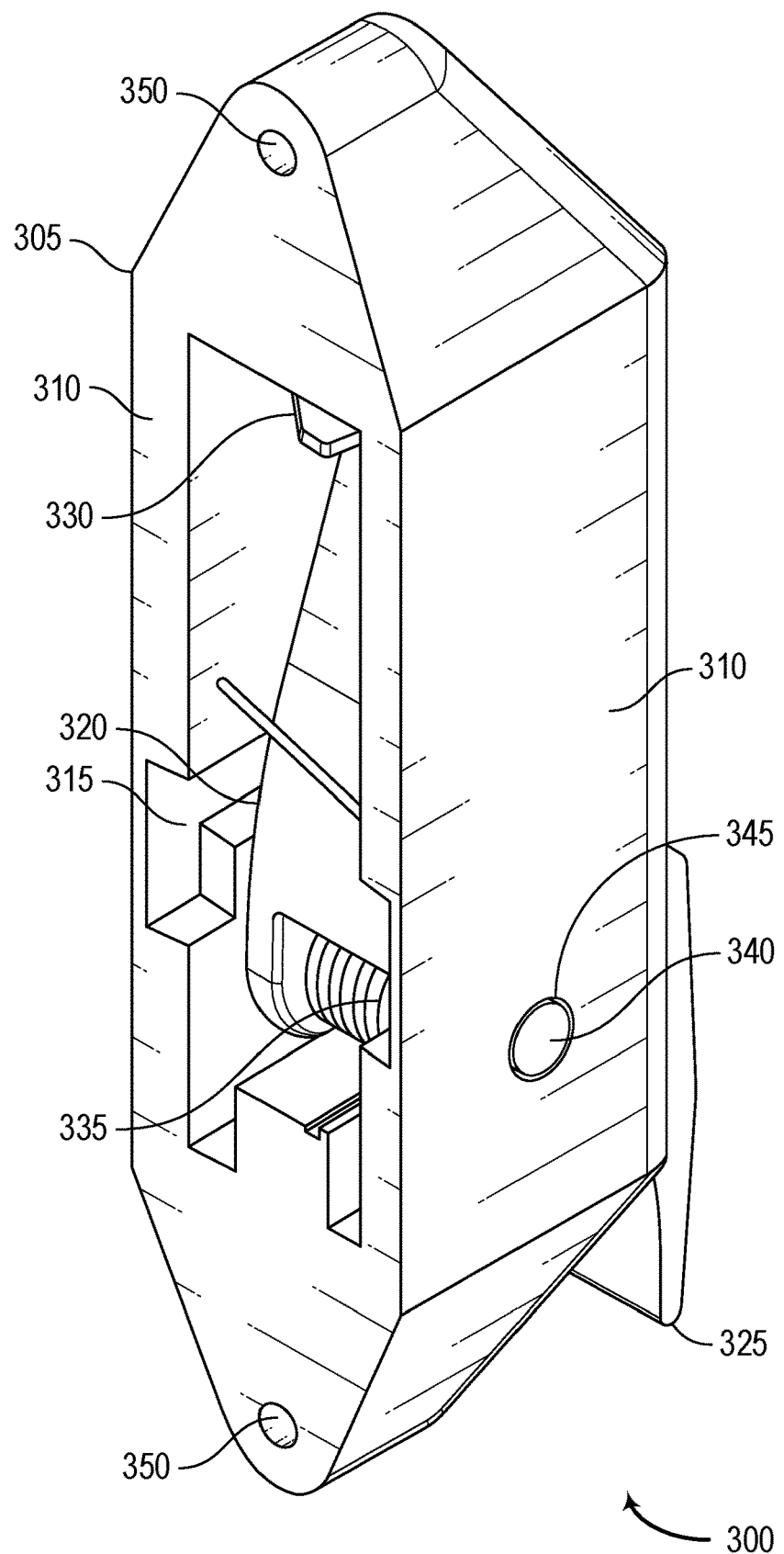
FIGS. 3 through 5 show examples of a locking assembly according to aspects of the present disclosure.

FIG. 3 shows an example of a locking assembly 300 according to aspects of the present disclosure.

The locking assembly 300 of FIG. 3 comprises a body 305, a latch lever 320, a pivot pin 340, a locking mechanism, and a lever return mechanism. FIG. 3 may illustrate the locking assembly 300 in an unlocked position (e.g., where the catch 330 of the latch lever 320 is configured inside the body 305 of the locking assembly 300 and is not engaged with an engagement portion of a fork ring).

Locking assembly 300 is an example of, or includes aspects of, the corresponding element described with reference to FIGS. 1, 4-10, and 12-18. In one embodiment, locking assembly 300 includes body 305, side wall 310, lock pin slot 315, latch lever 320, spring 335, pivot pin 340, pivot pin hole 345, and fastener hole 350.

Body 305 is an example of, or includes aspects of, the corresponding element described with reference to FIGS. 4, 5, 7-9, and 12-18.

Side wall 310 is an example of, or includes aspects of, the corresponding element described with reference to FIGS. 4, 12, and 13.

Lock pin slot 315 is an example of, or includes aspects of, the corresponding element described with reference to FIGS. 4, 5, and 12-15.

Latch lever 320 is an example of, or includes aspects of, the corresponding element described with reference to FIGS. 4, 5, 7-9, and 12-18. In one embodiment, latch lever 320 includes handle 325 and catch 330. Handle 325 is an example of, or includes aspects of, the corresponding element described with reference to FIGS. 4, 5, 7-9, and 12-18.

Catch 330 is an example of, or includes aspects of, the corresponding element described with reference to FIGS. 4, 5, 7-9, and 12-18. In the embodiments shown, the catch comprises a hook, although other attachment configurations suitable for engaging and releasing the fork ring as described herein are contemplated.

In some examples, the lever return mechanism includes a coiled spring 335. Spring 335 is an example of, or includes aspects of, the corresponding element described with reference to FIGS. 4 and 5.

Pivot pin 340 is an example of, or includes aspects of, the corresponding element described with reference to FIGS. 4, 5, and 12-18. Pivot pin hole 345 is an example of, or includes aspects of, the corresponding element described with reference to FIGS. 4, 5, and 12-15. Fastener hole 350 is an example of, or includes aspects of, the corresponding element described with reference to FIGS. 4, 5, and 12-15.

Figure 4:
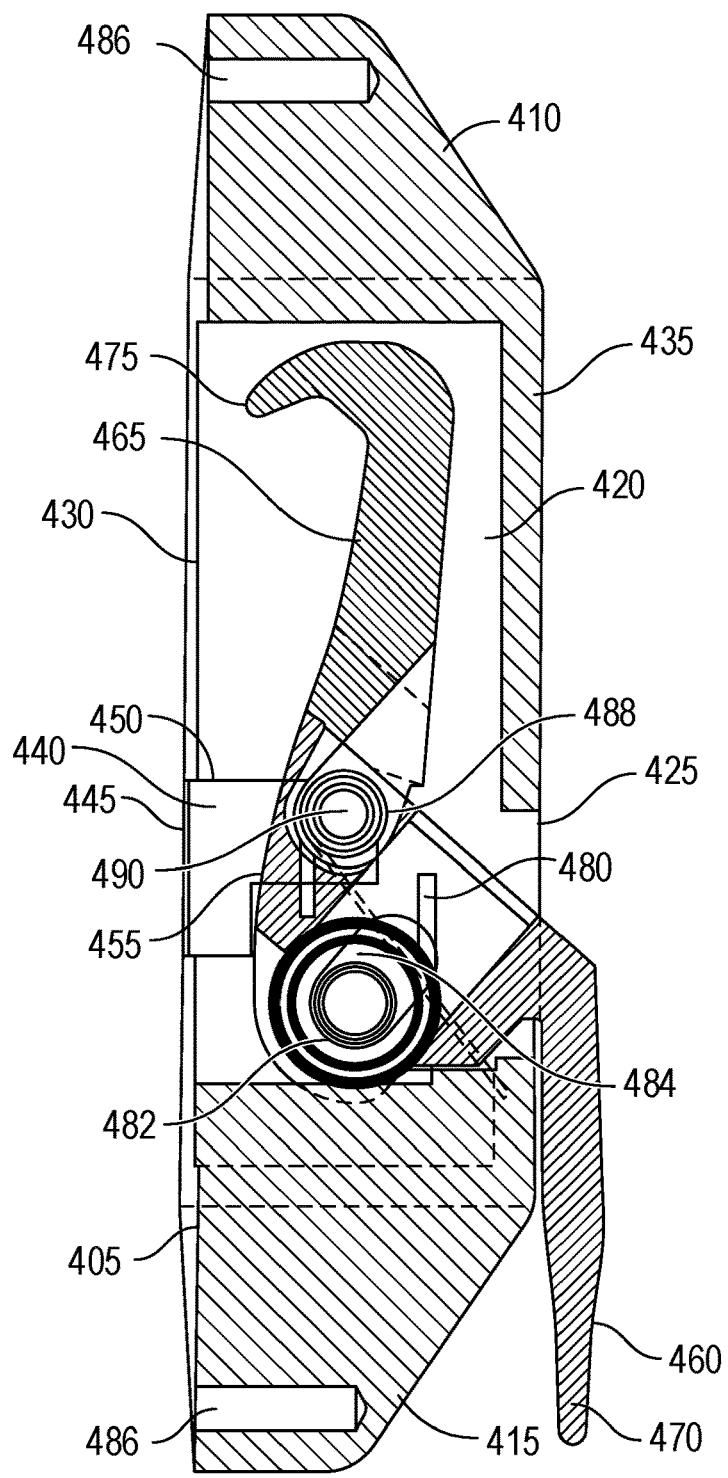

FIG. 4 shows an example of a locking assembly 400 according to aspects of the present disclosure.

A locking assembly 400 may be coupled to a fork guard of the motorcycle such that a portion of the locking assembly 400 may pass through the fork guard, wherein the locking assembly 400 is in spaced relationship to the fork ring. The locking assembly 400 may include a body 405 configured to couple to the fork guard. The locking assembly 400 may include a latch lever 455 movably coupled to the body 405 and including a first end 460 having a handle 470 and a second end 465 having a catch 475, wherein the latch lever 455 is coupled to the body 405 such that the latch lever 455 is movable between an unlocked position, an armed position, and an engaged position. The spaced relationship may further include the catch 475 being engaged by an engagement portion of the fork ring when the latch lever 455 is in the armed position and the fork ring moves below the catch 475 and subsequently moves upwards. The locking assembly 400 may include a lever return mechanism configured to automatically restore the latch lever 455 to the unlocked position.

The locking assembly 400 may include a locking mechanism configured to resist the automatic restoring of the latch lever 455 to the unlocked position when the latch lever 455 is in the armed position, wherein when the latch lever 455 is moves from the unlocked position to the armed position the latch lever 455 is maintained in the armed position prior to engagement by the fork ring.

The locking assembly 400 of FIG. 4 comprises a body 405, a latch lever 455, a pivot pin 482, a locking mechanism, and a lever return mechanism. FIG. 4 may illustrate the locking assembly 400 in an unlocked position (e.g., where the catch 475 of the latch lever 455 is configured inside the body 405 of the locking assembly 400 and is not engaged with an engagement portion of a fork ring).

The body 405 of a locking assembly 400 may be generally rectangular with an interior cavity 420, a first opening 425 on a rear face of the body 405, and a second opening 430 on a front face of the body 405. A top end 410 and a bottom end 415 of the body 405 may each be configured to receive a fastener. In one embodiment the configuration includes a threaded fastener hole 486. In some embodiments, the top end 410 and bottom end 415 of the body 405 may be elongated to receive the fastener. The side wall 435 of the body 405 are configured to receive a horizontal pivot pin 482 that spans across the cavity 420. In one embodiment the side wall 435 configuration is a body 405 pivot pin 482 through-hole in each side wall 435.

The latch lever 455 has a first end 460 having a handle 470 and a second end 465 having a catch 475. A middle portion of the latch lever 455 includes a pivot pin hole 484 (e.g., a pivot pin 482 through-hole). The pivot pin hole 484 is slotted such that the slot is in a first orientation when the latch lever 455 is in the unlocked position and in a second orientation when the latch lever 455 is in the armed and engaged positions. In the embodiment shown the pivot pin hole 484 is generally vertical when the latch lever 455 is in the second position (e.g., when the latch lever 455 is armed and engaged as further described herein, for example, with reference to FIGS. 5, 9, and 14). The pivot pin hole 484 is configured to receive the pivot pin 482 such that the latch lever 455 is pivotally coupled to the body 405 and rotatable between the unlocked and the armed/engaged orientation. The latch lever 455 may also move relative to the pivot pin 482 due to the slotted nature of the pivot pin hole 484.

In the embodiment shown in FIG. 4, the latch lever 455 comprises two parts that are pivotally coupled together. A first part which includes the first end has an opposite end distal to the first end that includes the lock pin hole 490 (the first end also includes the pivot hole 484. A second part which includes the second end has an opposite end distal to the second end that includes another lock pin hole 490. The lock pin 488 is inserted through both lock pin holes 290, which pivotally couples the parts together and forms a hinge at the lock pin 288. Other methods of forming a pivotal hinge (e.g. not utilizing the lock pin 488 in the hinge) may also be suitable.

The two-part hinged latch lever 455 as shown in FIG. 4 is advantageous because it allows the second end 465 to pivot/flex rearwards relative to the first end 460. This allows the second end 465 to pass by the fork ring more easily when the latch lever 455 is moving upwards relative to the fork ring. It also relieves forces on the latch lever 455 when the latch lever is engaged with the fork ring, which results in making it easier for the lock pin 488 to slide up and prepare for retraction from the fork ring.

In other embodiments, the latch lever 455 may be a single integral piece.

The locking mechanism is configured to allow the latch lever 455 to move from an unlocked position to a locked position and, once the latch lever 455 is in the locked position, keep the latch lever 455 in the locked position and prevent the latch lever 455 from automatically returning to the unlocked position without further action on the latch lever 455. In the embodiments shown herein, the locking mechanism comprises a generally L-shaped lock pin slot 440 in the interior face of at least one side wall 435 of the body 405, a lock pin hole 488 in the latch lever 455 proximate to the second end 465 of the latch lever 455, and a lock pin 490 coupled to the lock pin hole 488 and the lock pin slot 440 such that the latch lever 455 may be moved such that the lock pin 490 travels in the slot. The lock pin slot 440 includes a generally vertical portion 445 proximate to the front side of the body 405 and a generally horizontal position that extends rearwards from the top of the vertical portion 445. In the embodiments shown the lock pin hole 488 in the latch lever 455 is a through-hole and each side of the body 405 includes the lock pin slot 440 with the lock pin 490 received therein.

When the latch lever 455 is coupled to the body 405 the handle 470 extends through the first opening 425 such that it is accessible (e.g., by a rider of the motorcycle) and movable between the unlocked and armed positions. The catch 475 is extended through the second opening 430 such that it is engageable by the fork ring and movable between the unlocked, armed, and engaged positions. When the latch lever 455 is in the unlocked position, the second end 465 resides entirely within the cavity 420. In some embodiments, the second opening 430 extends the entire height of the cavity 420. In some embodiments, the second opening 430 extends the entire width of the cavity 420.

Locking assembly 400 is an example of, or includes aspects of, the corresponding element described with reference to FIGS. 1, 3, 5-10, and 12-18. In one embodiment, locking assembly 400 includes body 405, side wall 435, lock pin slot 440, latch lever 455, spring 480, pivot pin 482, pivot pin hole 484, fastener hole 486, lock pin hole 488, and lock pin 490.

Body 405 is an example of, or includes aspects of, the corresponding element described with reference to FIGS. 3, 5, 7-9, and 12-18. In one embodiment, body 405 includes top end 410, bottom end 415, cavity 420, first opening 425, and second opening 430. According to some embodiments, top end 410 and a bottom end 415 of the body 405 are each configured to receive a fastener. Top end 410 is an example of, or includes aspects of, the corresponding element described with reference to FIGS. 5, and 12-15. Bottom end 415 is an example of, or includes aspects of, the corresponding element described with reference to FIGS. 5, and 12-15.

In some examples, the body 405 includes an interior cavity 420, and where the catch 475 resides entirely within the cavity 420 when the latch lever 455 is in the unlocked position. In some examples, the body 405 includes a cavity 420 and the movable coupling of the latch lever 455 to the body 405 includes a slotted through-hole in the latch lever 455 and a pivot pin 482 spanning the cavity 420, where the latch lever 455 is movably coupled to the body 405 by the pivot pin 482 passing through the slotted through-hole such that at least a portion of the latch lever 455 resides within the cavity 420.

Cavity 420 is an example of, or includes aspects of, the corresponding element described with reference to FIGS. 5, and 12-15. First opening 425 is an example of, or includes aspects of, the corresponding element described with reference to FIGS. 5, and 13-15. Second opening 430 is an example of, or includes aspects of, the corresponding element described with reference to FIGS. 5, and 13-15.

Side wall 435 is an example of, or includes aspects of, the corresponding element described with reference to FIGS. 3, 12, and 13. Lock pin slot 440 is an example of, or includes aspects of, the corresponding element described with reference to FIGS. 3, 5, and 12-15. In one embodiment, lock pin slot 440 includes vertical portion 445 and horizontal portion 450.

Vertical portion 445 is an example of, or includes aspects of, the corresponding element described with reference to FIGS. 12-15. Horizontal portion 450 is an example of, or includes aspects of, the corresponding element described with reference to FIGS. 12-15.

Latch lever 455 is an example of, or includes aspects of, the corresponding element described with reference to FIGS. 3, 5, 7-9, and 12-18. In one embodiment, latch lever 455 includes first end 460, second end 465, handle 470, and catch 475. First end 460 is an example of, or includes aspects of, the corresponding element described with reference to FIGS. 5, and 12-15. Second end 465 is an example of, or includes aspects of, the corresponding element described with reference to FIGS. 5, and 12-15. Handle 470 is an example of, or includes aspects of, the corresponding element described with reference to FIGS. 3, 5, 7-9, and 12-18. Catch 475 is an example of, or includes aspects of, the corresponding element described with reference to FIGS. 3, 5, 7-9, and 12-18.

Spring 480 is an example of, or includes aspects of, the corresponding element described with reference to FIGS. 3 and 5. Pivot pin 482 is an example of, or includes aspects of, the corresponding element described with reference to FIGS. 3, 5, and 12-18. Pivot pin hole 484 is an example of, or includes aspects of, the corresponding element described with reference to FIGS. 3, 5, and 12-15.

Fastener hole 486 is an example of, or includes aspects of, the corresponding element described with reference to FIGS. 3, 5, and 12-15. Lock pin hole 488 is an example of, or includes aspects of, the corresponding element described with reference to FIGS. 5, and 13-15. Lock pin 490 is an example of, or includes aspects of, the corresponding element described with reference to FIGS. 5, and 13-15.

Figure 5:
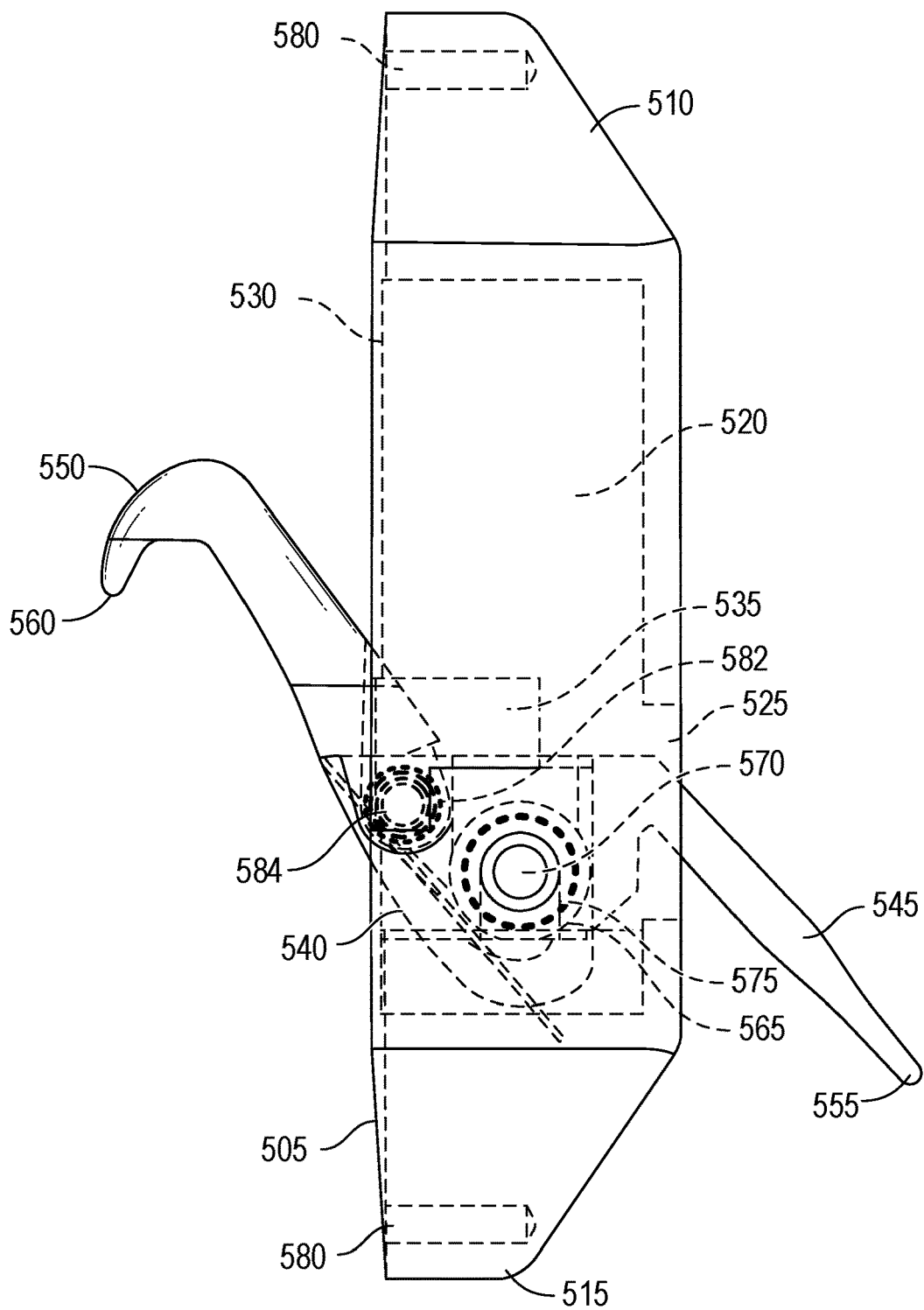

FIG. 5 shows an example of a locking assembly 500 according to aspects of the present disclosure. The locking assembly 500 of FIG. 5 comprises a body 505, a latch lever 540, a pivot pin 570, a locking mechanism, and a lever return mechanism. FIG. 5 may illustrate the locking assembly 500 in an armed position (e.g., where the catch 560 of the latch lever 540 is configured outside the body 505 of the locking assembly 500 and is engaged with an engagement portion of a fork ring). In the embodiment shown the pivot pin hole 575 is generally vertical when the latch lever 540 is in the second position (armed and engaged).

As described, when the latch lever 540 is coupled to the body 505 the handle 555 extends through the first opening 525 such that it is accessible (e.g., by a rider of the motorcycle) and movable between the unlocked and armed positions. The catch 560 is extended through the second opening 530 such that it is engageable by the fork ring and movable between the unlocked, armed, and engaged positions. The lever return mechanism (e.g., the spring 565) is configured to automatically move the lever from the engaged position where the catch 560 is engaged with the fork ring to the original unlocked position when the catch 560 is released from the fork ring due to downward movement of the fork ring. In the embodiment of FIG. 5, the lever return mechanism may be a coiled spring 565 coupled to the latch lever 540 and biasing the latch lever 540 towards the unlocked position. In other embodiments, the lever return mechanism may utilize magnets (e.g., as described herein, for example, with reference to FIGS. 13-15), other springs 565 e.g., as described herein, for example, with reference to FIGS. 16-18), etc.

Locking assembly 500 is an example of, or includes aspects of, the corresponding element described with reference to FIGS. 1, 3, 4, 6-10, and 12-18. In one embodiment, locking assembly 500 includes body 505, lock pin slot 535, latch lever 540, spring 565, pivot pin 570, pivot pin hole 575, fastener hole 580, and lock pin hole 582.

Body 505 is an example of, or includes aspects of, the corresponding element described with reference to FIGS. 3, 4, 7-9, and 12-18. In one embodiment, body 505 includes top end 510, bottom end 515, cavity 520, first opening 525, and second opening 530. Top end 510 is an example of, or includes aspects of, the corresponding element described with reference to FIGS. 4, and 12-15. Bottom end 515 is an example of, or includes aspects of, the corresponding element described with reference to FIGS. 4, and 12-15.

Cavity 520 is an example of, or includes aspects of, the corresponding element described with reference to FIGS. 4, and 12-15. First opening 525 is an example of, or includes aspects of, the corresponding element described with reference to FIGS. 4, and 13-15. Second opening 530 is an example of, or includes aspects of, the corresponding element described with reference to FIGS. 4, and 13-15.

Lock pin slot 535 is an example of, or includes aspects of, the corresponding element described with reference to FIGS. 3, 4, and 12-15. Latch lever 540 is an example of, or includes aspects of, the corresponding element described with reference to FIGS. 3, 4, 7-9, and 12-18. In one embodiment, latch lever 540 includes first end 545, second end 550, handle 555, and catch 560.

First end 545 is an example of, or includes aspects of, the corresponding element described with reference to FIGS. 4, and 12-15. Second end 550 is an example of, or includes aspects of, the corresponding element described with reference to FIGS. 4, and 12-15. Handle 555 is an example of, or includes aspects of, the corresponding element described with reference to FIGS. 3, 4, 7-9, and 12-18. Catch 560 is an example of, or includes aspects of, the corresponding element described with reference to FIGS. 3, 4, 7-9, and 12-18.

Spring 565 is an example of, or includes aspects of, the corresponding element described with reference to FIGS. 3 and 4. Pivot pin 570 is an example of, or includes aspects of, the corresponding element described with reference to FIGS. 3, 4, and 12-18. Pivot pin hole 575 is an example of, or includes aspects of, the corresponding element described with reference to FIGS. 3, 4, and 12-15.

Fastener hole 580 is an example of, or includes aspects of, the corresponding element described with reference to FIGS. 3, 4, and 12-15.

Lock pin hole 582 is an example of, or includes aspects of, the corresponding element described with reference to FIGS. 4, and 13-15. Lock pin 584 is an example of, or includes aspects of, the corresponding element described with reference to FIGS. 4 and 13-15.

Figure 6:
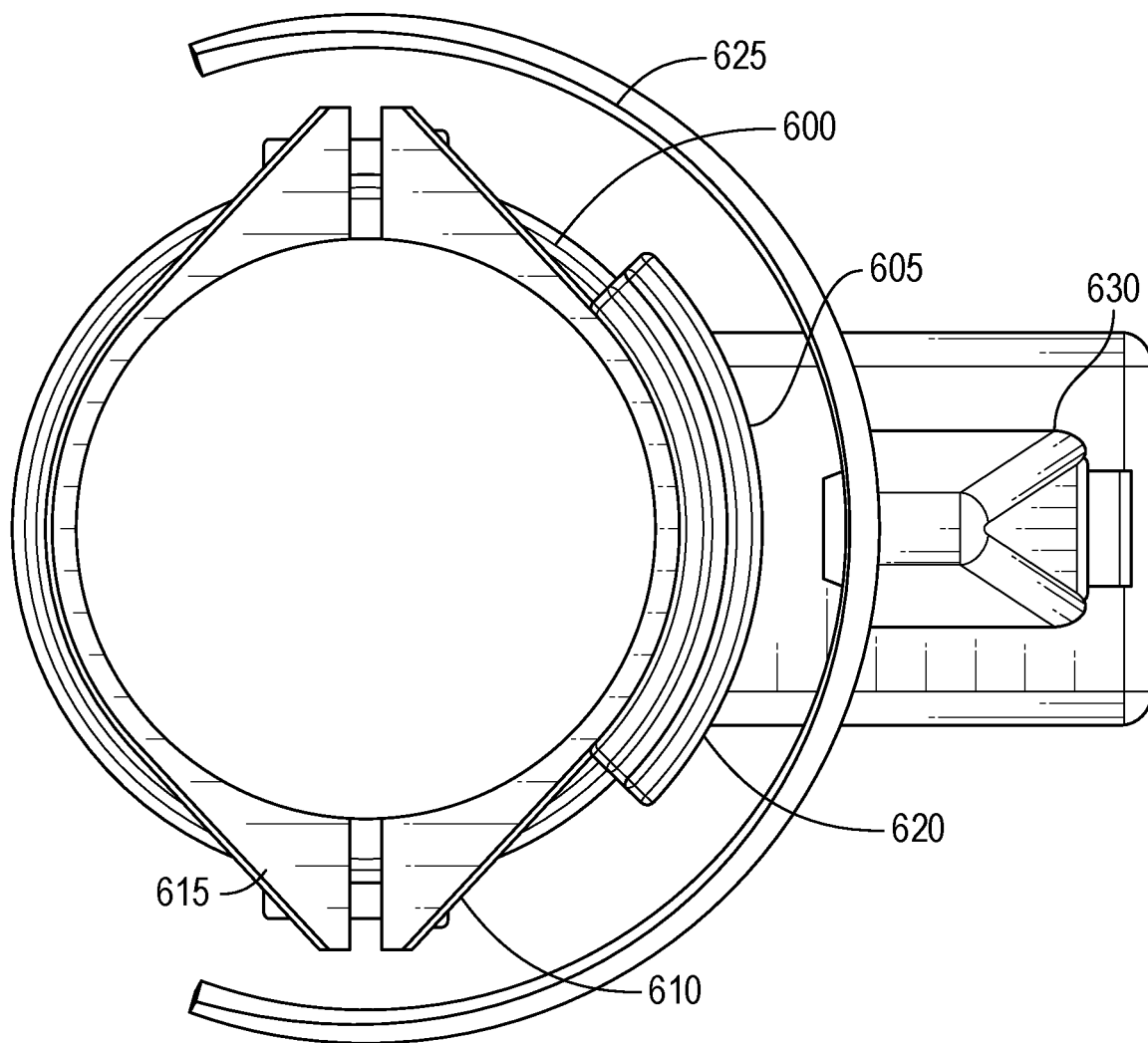
FIG. 6 shows an example of a plan view of an automatic fork suppression system according to aspects of the present disclosure.

FIG. 6 shows an example of a plan view of an automatic fork suppression system (e.g., a plan view of the automatic fork suppression system of FIG. 1) according to aspects of the present disclosure. The example shown includes upper fork tube 600, fork ring 605, fork guard 625, and locking assembly 630.

Upper fork tube 600 is an example of, or includes aspects of, the corresponding element described with reference to FIGS. 1, and 7-10. Fork ring 605 is an example of, or includes aspects of, the corresponding element described with reference to FIGS. 1, 2, and 7-11. In one embodiment, fork ring 605 includes front segment 610, rear segment 615, and engagement portion 620. Front segment 610 is an example of, or includes aspects of, the corresponding element described with reference to FIGS. 2 and 11. Rear segment 615 is an example of, or includes aspects of, the corresponding element described with reference to FIGS. 2 and 11. Engagement portion 620 is an example of, or includes aspects of, the corresponding element described with reference to FIGS. 2, 7-9, and 11.

Fork guard 625 is an example of, or includes aspects of, the corresponding element described with reference to FIGS. 1, and 7-10. Locking assembly 630 is an example of, or includes aspects of, the corresponding element described with reference to FIGS. 1, 3-5, 7-10, and 12-18.

Figure 7:
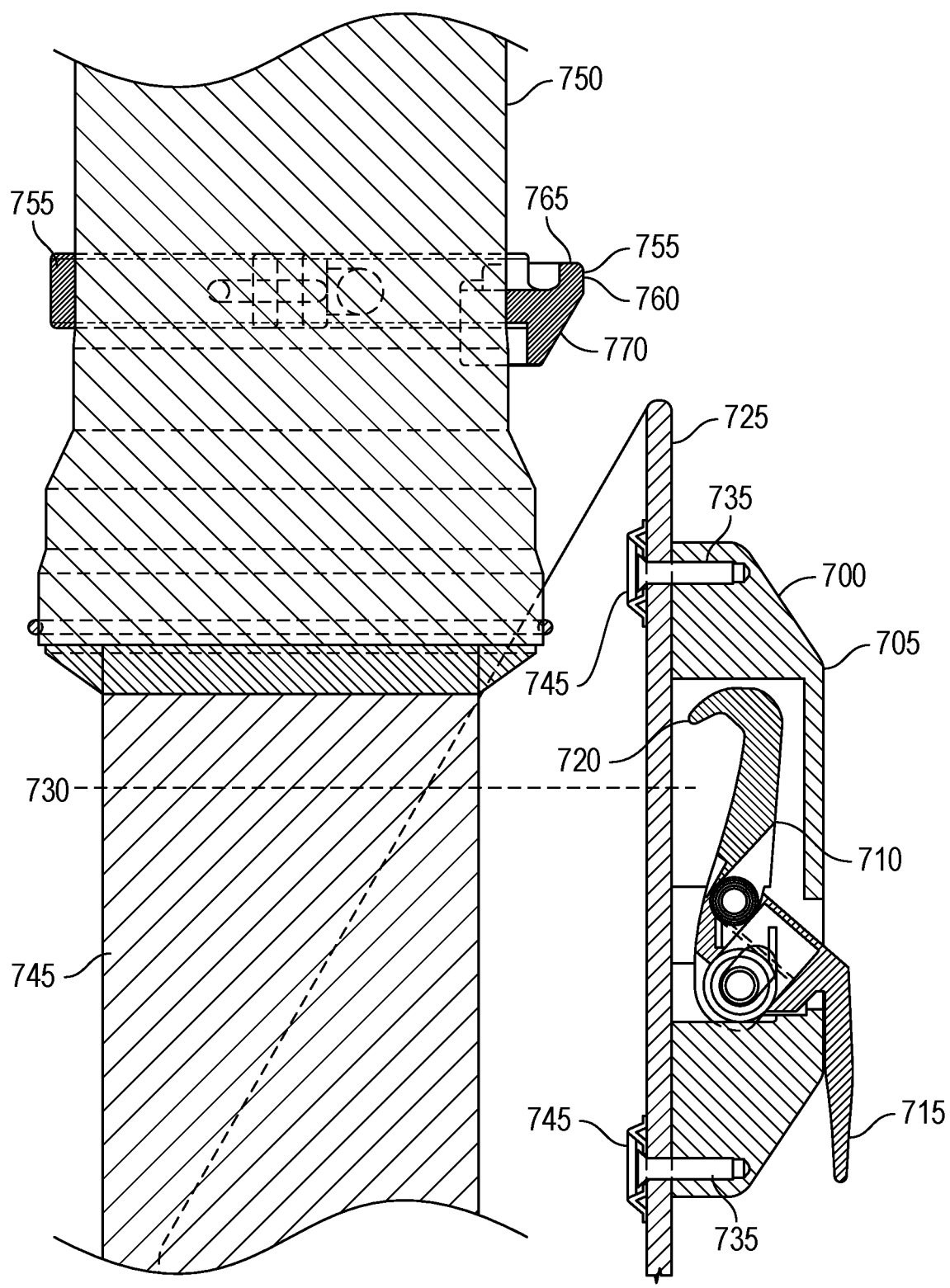
FIGS. 7 through 9 show examples of an automatic fork suppression system according to aspects of the present disclosure.

FIG. 7 shows an example of an automatic fork suppression system according to aspects of the present disclosure. The example shown includes locking assembly 700, fork guard 725, fastener 735, washer 740, lower fork tube 745, upper fork tube 750, and fork ring 755.

FIG. 7 shows one or more aspects of operating the automatic fork suppression system, where the automatic fork suppression system is in the unlocked position. The latch lever 710 is in the unlocked position, with the catch 720 residing within the cavity. This allows the fork ring 755 to move freely past the locking mechanism without contacting the locking assembly 700 and the fork motion is unsuppressed. The handle 715 is in the unlocked position, which configured for grasping (e.g., by a rider of the motorcycle). The lock pin is in the unlocked position in the lock pin slot, near the end of the upper horizontal slot (i.e. the end distal to the fork).

Further, FIG. 7 shows an embodiment where the locking assembly 700 is fixedly coupled to the fork. In the embodiment of FIG. 7, the locking assembly 700 is coupled to the fork guard 725 using threaded fasteners 735 and washers 740. When the locking assembly 700 is coupled to the fork guard 725, a hole in the fork guard 725 allows the catch 720 of the latch lever 710 to extend through the fork guard 725 and toward the fork tube. In some examples, a hole in the fork guard 725 may have substantially the same height as a cavity of the body 705 of the locking assembly 700, substantially the same width as a cavity of the body 705 of the locking assembly 700, or both (e.g., such that the catch 720 of the latch lever 710 to extend from the cavity of the locking assembly 700 through the fork guard 725 and toward the fork tube). The fork ring 755 is coupled to the upper fork tube 750 such that the fork ring 755 is located above the catch 720 and the engagement portion 760 is in line with the catch 720. In some examples, a rider of the motorcycle may also locate the fork ring 755 relative to the locking assembly 700 depending on how much vertical movement the rider wants to suppress the fork (e.g., the lower fork tube 745 into the upper fork tube 750). The location of the fork ring 755 relative to the locking assembly 700 is such that when the latch lever 710 is in the armed position and upper fork tube 750 moves downward past the catch 720 of the latch lever 710 and then subsequently upwards, the lip 765 engages the catch 720 of the latch lever 710.

Locking assembly 700 is an example of, or includes aspects of, the corresponding element described with reference to FIGS. 1, 3-6, 8-10, and 12-18. In one embodiment, locking assembly 700 includes body 705 and latch lever 710. Body 705 is an example of, or includes aspects of, the corresponding element described with reference to FIGS. 3-5, 8, 9, and 12-18.

Latch lever 710 is an example of, or includes aspects of, the corresponding element described with reference to FIGS. 3-5, 8, 9, and 12-18. In one embodiment, latch lever 710 includes handle 715 and catch 720.

Handle 715 is an example of, or includes aspects of, the corresponding element described with reference to FIGS. 3-5, 8, 9, and 12-18. Catch 720 is an example of, or includes aspects of, the corresponding element described with reference to FIGS. 3-5, 8, 9, and 12-18.

Fork guard 725 is an example of, or includes aspects of, the corresponding element described with reference to FIGS. 1, 6, and 8-10. In one embodiment, fork guard 725 includes fork guard hole 730. Fork guard hole 730 is an example of, or includes aspects of, the corresponding element described with reference to FIG. 8.

Fastener 735 is an example of, or includes aspects of, the corresponding element described with reference to FIGS. 8 and 9. Washer 740 is an example of, or includes aspects of, the corresponding element described with reference to FIGS. 8 and 9.

Lower fork tube 745 is an example of, or includes aspects of, the corresponding element described with reference to FIGS. 1, and 8-10. Upper fork tube 750 is an example of, or includes aspects of, the corresponding element described with reference to FIGS. 1, 6, and 8-10.

Fork ring 755 is an example of, or includes aspects of, the corresponding element described with reference to FIGS. 1, 2, 6, and 8-11. In one embodiment, fork ring 755 includes engagement portion 760.

Engagement portion 760 is an example of, or includes aspects of, the corresponding element described with reference to FIGS. 2, 6, 8, 9, and 11. In one embodiment, engagement portion 760 includes lip 765 and sloped lower surface 770. Lip 765 is an example of, or includes aspects of, the corresponding element described with reference to FIGS. 2, 8, 9, and 11. Sloped lower surface 770 is an example of, or includes aspects of, the corresponding element described with reference to FIGS. 8 and 9.

Figure 8:
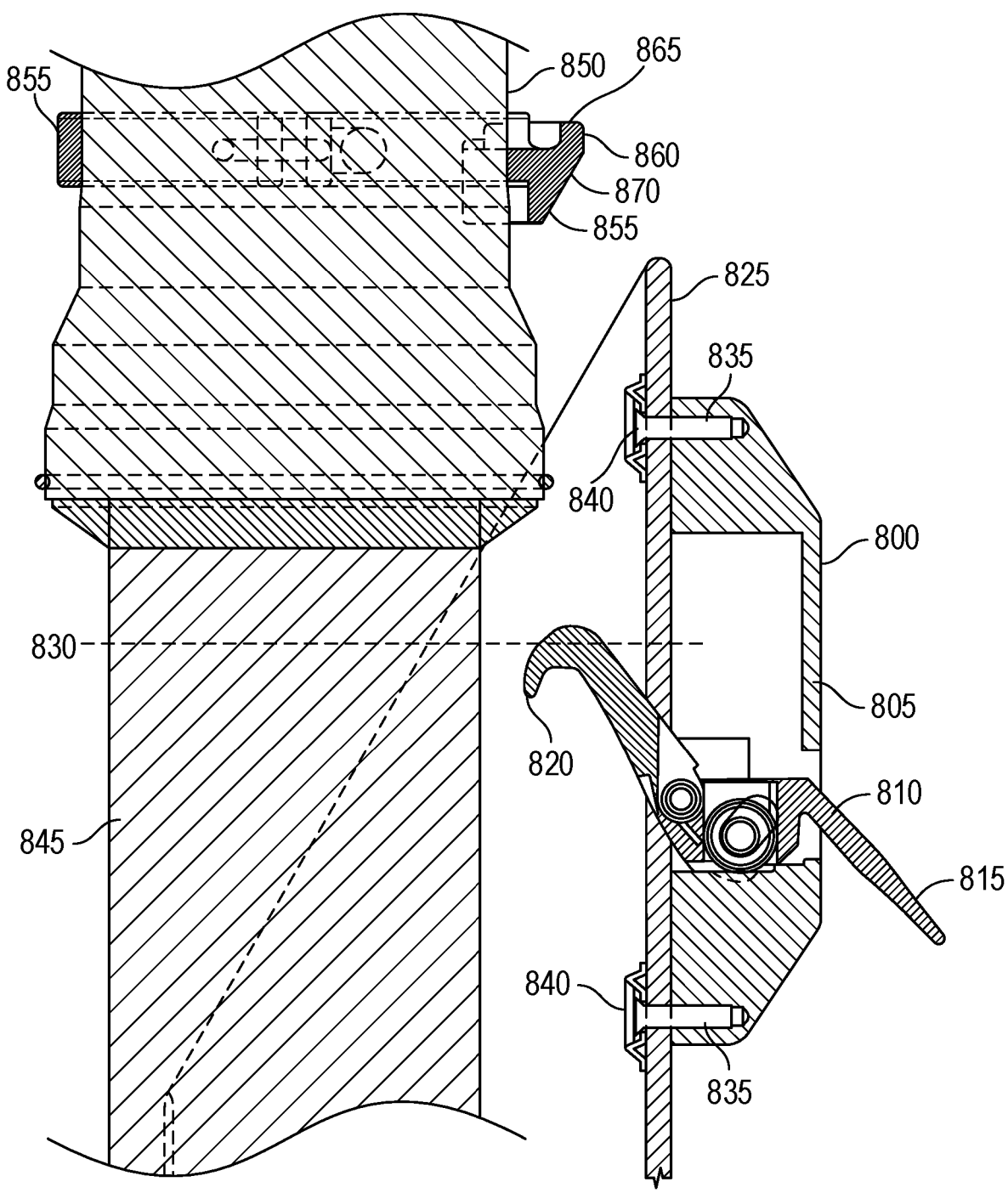

FIG. 8 shows an example of an automatic fork suppression system according to aspects of the present disclosure. The example shown includes locking assembly 800, fork guard 825, fastener 835, washer 840, lower fork tube 845, upper fork tube 850, and fork ring 855.

FIG. 8 shows one or more aspects of operating the automatic fork suppression system. For instance, when the rider wishes to lock the fork, the rider moves the handle 815 upward to the armed position. The locking assembly 800 in the armed position is shown in FIG. 8. As a result of moving the handle 815 to the armed position, the latch lever 810 rotates counterclockwise about the pivot pin, moving the catch 820 past the fork guard 825 and inwards towards the fork. The movement of the latch lever 810 also moves the lock pin in the lock pin slot through the L-shaped slot to the armed position at the other end of the slot, located at the position downwards and inwards (i.e. towards the fork). The lever return mechanism exerts a returning force on the latch lever 810 at this point, but the force is resisted by the interaction of the lock pin with the side of the slot, preventing the latch lever 810 from returning to the unlocked position. The catch 820 is now is a position such that when the engagement portion 860 next moves downwards past the catch 820, upwards movement passing the catch 820 will result in the lip 865 of the fork ring 855 catching the catch 820, whereby the catch 820 restrains the fork upper tube from further upwards movement.

Locking assembly 800 is an example of, or includes aspects of, the corresponding element described with reference to FIGS. 1, 3-7, 9, 10, and 12-18. In one embodiment, locking assembly 800 includes body 805 and latch lever 810.

Body 805 is an example of, or includes aspects of, the corresponding element described with reference to FIGS. 3-5, 7, 9, and 12-18.

Latch lever 810 is an example of, or includes aspects of, the corresponding element described with reference to FIGS. 3-5, 7, 9, and 12-18. In one embodiment, latch lever 810 includes handle 815 and catch 820.

Handle 815 is an example of, or includes aspects of, the corresponding element described with reference to FIGS. 3-5, 7, 9, and 12-18. Catch 820 is an example of, or includes aspects of, the corresponding element described with reference to FIGS. 3-5, 7, 9, and 12-18.

Fork guard 825 is an example of, or includes aspects of, the corresponding element described with reference to FIGS. 1, 6, 7, 9, and 10. In one embodiment, fork guard 825 includes fork guard hole 830. Fork guard hole 830 is an example of, or includes aspects of, the corresponding element described with reference to FIG. 7.

Fastener 835 is an example of, or includes aspects of, the corresponding element described with reference to FIGS. 7 and 9. Washer 840 is an example of, or includes aspects of, the corresponding element described with reference to FIGS. 7 and 9.

Lower fork tube 845 is an example of, or includes aspects of, the corresponding element described with reference to FIGS. 1, 7, 9, and 10. Upper fork tube 850 is an example of, or includes aspects of, the corresponding element described with reference to FIGS. 1, 6, 7, 9, and 10. Fork ring 855 is an example of, or includes aspects of, the corresponding element described with reference to FIGS. 1, 2, 6, 7, and 9-11. In one embodiment, fork ring 855 includes engagement portion 860.

Engagement portion 860 is an example of, or includes aspects of, the corresponding element described with reference to FIGS. 2, 6, 7, 9, and 11. In one embodiment, engagement portion 860 includes lip 865 and sloped lower surface 870. Lip 865 is an example of, or includes aspects of, the corresponding element described with reference to FIGS. 2, 7, 9, and 11. Sloped lower surface 870 is an example of, or includes aspects of, the corresponding element described with reference to FIGS. 7 and 9.

Figure 9:
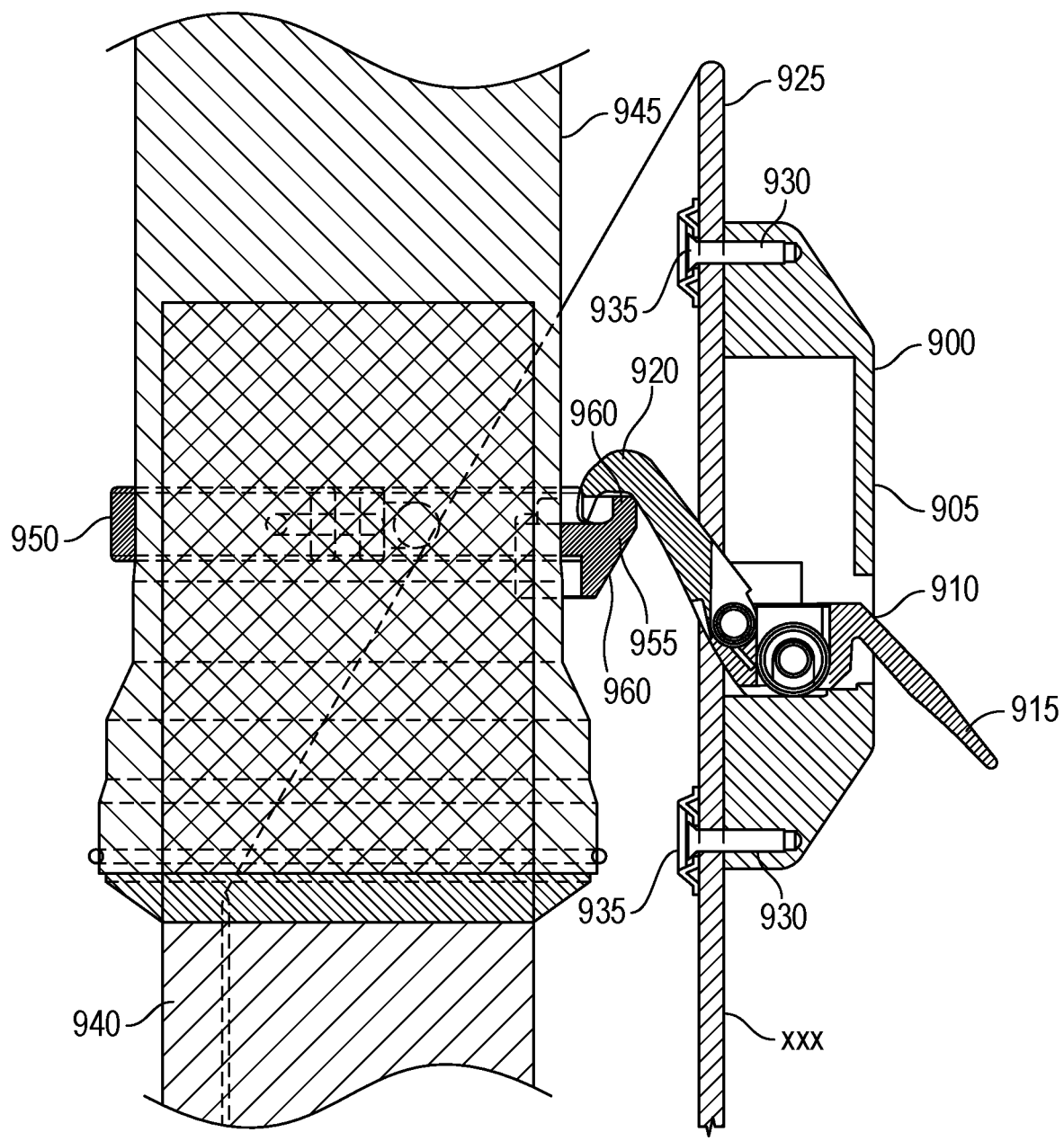

FIG. 9 shows an example of an automatic fork suppression system according to aspects of the present disclosure. The example shown includes locking assembly 900, fork guard 925, fastener 930, washer 935, lower fork tube 940, upper fork tube 945, and fork ring 950.

A method for automatic fork suppression of a motorcycle by an automatic fork suppression system is described. The automatic fork suppression system includes a fork ring 950 fixedly coupled to a fork tube of the motorcycle and a locking assembly 900 fixedly coupled to a fork guard 925 of the motorcycle and in spaced relation to the fork ring 950. The method for automatic fork suppression of a motorcycle by the automatic fork suppression system includes moving a handle 915 of the locking assembly 900 from an unlocked position to an armed position while the fork ring 950 is located above the locking assembly 900, wherein a catch 920 of a latch lever 910 of the locking assembly 900 moves from an unlocked position to an armed position. The method for automatic fork suppression of a motorcycle by the automatic fork suppression system also includes moving the fork ring 950 downward past the catch 920 and subsequently moving the fork ring 950 upwards, where the catch 920 is engaged by the fork ring 950, wherein further upward movement of the fork tube is suppressed. The method for automatic fork suppression of a motorcycle by the automatic fork suppression system also includes moving the fork ring 950 downwards subsequent to moving the fork ring 950 upwards, where the catch 920 is disengaged by the fork ring 950. The method for automatic fork suppression of a motorcycle by the automatic fork suppression system also includes returning the latch lever 910 to the unlocked position automatically as a result of the catch 920 disengaging from the fork ring 950.

In some examples, the unlocked position includes the catch 920 being contained within a cavity of a body 905 of the locking mechanism. In some examples, moving of the catch 920 from the unlocked position to the armed position includes the catch 920 exiting the cavity towards the fork tube. In some examples, the body 905 is configured to couple to an outer surface of the fork guard 925. In some examples, the automatic returning is executed by a lever return mechanism of the locking assembly 900. In some examples, the lever return mechanism includes a spring coupled to the latch lever 910. In some examples, the locking assembly 900 further includes a locking mechanism configured to resist the execution of the lever return mechanism prior to the engagement of the catch 920 by the fork ring 950. In some examples, the locking mechanism includes a lock pin coupled to the latch lever 910 and at least one lock pin slot in the body 905, where each lock pin slot of the body 905 receives one end of the lock pin and where the lock pin slides within the lock pin slot.

A method for installing an automatic fork suppression system on a motorcycle is described. The automatic fork suppression system may include a fork comprising a lower fork tube 940 coupled to and sharing a longitudinal axis with an upper fork tube 945, where the upper fork tube 945 is configured to move relative to the lower fork tube 940 along the longitudinal axis. The motorcycle may include a fork guard 925 coupled to the lower fork tube 940. The method for installing an automatic fork suppression system on a motorcycle may include providing a hole in the fork guard 925. The method for installing an automatic fork suppression system on a motorcycle may also include coupling a lock assembly to the fork guard 925. The lock assembly may include a body 905 and a latch lever 910 pivotably coupled to the body 905 such that the latch lever 910 is movable between an unlocked position and an armed position.

The latch lever 910 is coupled to a locking mechanism and has a catch 920 at a first end of the latch lever 910 and a handle 915 at a second end of the latch lever 910. The lock assembly is coupled to the fork guard 925 such that the fork guard 925 hole allows pass-through of the catch 920 of the lock latch lever 910. The method for installing an automatic fork suppression system on a motorcycle may also include coupling a fork ring 950 to the upper fork tube 945. The fork ring 950 may have an engagement portion 955 configured to engage with the catch 920 when the latch lever 910 is in the armed position.

The coupling may include locating the engagement portion 955 in spaced relationship to the latch lever 910 such that the catch 920 in the armed position engages with the engagement portion 955 when the fork ring 950 moves upwards from a position below the catch 920. A method for installing an automatic fork suppression system on a motorcycle is described. The automatic fork suppression system may include a fork comprising a lower fork tube 940 coupled to and sharing a longitudinal axis with an upper fork tube 945, where the upper fork tube 945 is configured to move relative to the lower fork tube 940 along the longitudinal axis. The motorcycle may include a fork guard 925 coupled to the lower fork tube 940.

The method for installing an automatic fork suppression system on a motorcycle may include providing a hole in the fork guard 925. The method for installing an automatic fork suppression system on a motorcycle may also include coupling a lock assembly to the fork guard 925. The lock assembly may include a body 905 and a latch lever 910 pivotably coupled to the body 905 such that the latch lever 910 is movable between an unlocked position and an armed position. The latch lever 910 is coupled to a locking mechanism and has a catch 920 at a first end of the latch lever 910 and a handle 915 at a second end of the latch lever 910.

The lock assembly is coupled to the fork guard 925 such that the fork guard 925 hole allows pass-through of the catch 920 of the lock latch lever 910. The method for installing an automatic fork suppression system on a motorcycle may also include coupling a fork ring 950 to the upper fork tube 945. The fork ring 950 may have an engagement portion 955 configured to engage with the catch 920 when the latch lever 910 is in the armed position. The coupling may include locating the engagement portion 955 in spaced relationship to the latch lever 910 such that the catch 920 in the armed position engages with the engagement portion 955 when the fork ring 950 moves upwards from a position below the catch 920.

FIG. 9 shows one or more aspects of operating the automatic fork suppression system. For instance, FIG. 9 may illustrate the catching of the lip 960 by the catch 920. The sloping surface of the engagement portion 955 of the fork ring 950 and the rounded upper surface of the catch 920 allow the fork ring 950 to slide downwards past the catch 920 without impeding he movement of the fork ring 950, while still allowing the catch 920 to be in the proper location to catch the lip 960 of the fork ring 950 as the fork ring 950 subsequently rises. In one embodiment, the angle between horizontal and the sloping surface is 60 degrees.

After the catch 920 catches the lip 960, the vertical portion of the lock pin slot and the pivot pin slot allow for the latch lever 910 to move vertically upwards until the lock pin can no longer move vertically upwards in the slot. This is the engaged position (e.g., aspects of which are further described herein, for example, with reference to FIG. 15). The fork ring 950 is still engaged with the lip 960 at this time. During the time the fork continuously exerts an upwards force on the catch 920, the latch lever 910 stays in this position and the upwards movement of the fork is arrested/suppressed.

At the next time the fork moves downwards, the catch 920 is disengaged from the fork ring 950. Since the lock pin is now in the upper portion of the lock pin slot, the returning force of the lever return mechanism is not resisted, and the lever return mechanism automatically returns the latch lever 910 to the original unlocked position and the fork is again free to move without suppression. The automatic fork suppression system described herein allows a user (e.g., a motorcycle rider) to suppress the forks of the motorcycle without the help of a second person and eliminate doing it manually. This gives the rider the freedom and ease of using the automatic fork suppression system anytime even when no one is around or available.

Locking assembly 900 is an example of, or includes aspects of, the corresponding element described with reference to FIGS. 1, 3-8, 10, and 12-18. In one embodiment, locking assembly 900 includes body 905 and latch lever 910.

Body 905 is an example of, or includes aspects of, the corresponding element described with reference to FIGS. 3-5, 7, 8, and 12-18.

Latch lever 910 is an example of, or includes aspects of, the corresponding element described with reference to FIGS. 3-5, 7, 8, and 12-18. In one embodiment, latch lever 910 includes handle 915 and catch 920.

Handle 915 is an example of, or includes aspects of, the corresponding element described with reference to FIGS. 3-5, 7, 8, and 12-18. Catch 920 is an example of, or includes aspects of, the corresponding element described with reference to FIGS. 3-5, 7, 8, and 12-18.

Fork guard 925 is an example of, or includes aspects of, the corresponding element described with reference to FIGS. 1, 6-8, and 10. Fastener 930 is an example of, or includes aspects of, the corresponding element described with reference to FIGS. 7 and 8. Washer 935 is an example of, or includes aspects of, the corresponding element described with reference to FIGS. 7 and 8.

Lower fork tube 940 is an example of, or includes aspects of, the corresponding element described with reference to FIGS. 1, 7, 8, and 10. Upper fork tube 945 is an example of, or includes aspects of, the corresponding element described with reference to FIGS. 1, 6-8, and 10. Fork ring 950 is an example of, or includes aspects of, the corresponding element described with reference to FIGS. 1, 2, 6-8, 10, and 11. In one embodiment, fork ring 950 includes engagement portion 955. Engagement portion 955 is an example of, or includes aspects of, the corresponding element described with reference to FIGS. 2, 6-8, and 11. In one embodiment, engagement portion 955 includes lip 960 and sloped lower surface 965. Lip 960 is an example of, or includes aspects of, the corresponding element described with reference to FIGS. 2, 7, 8, and 11. Sloped lower surface 965 is an example of, or includes aspects of, the corresponding element described with reference to FIGS. 7 and 8.

Figure 10:
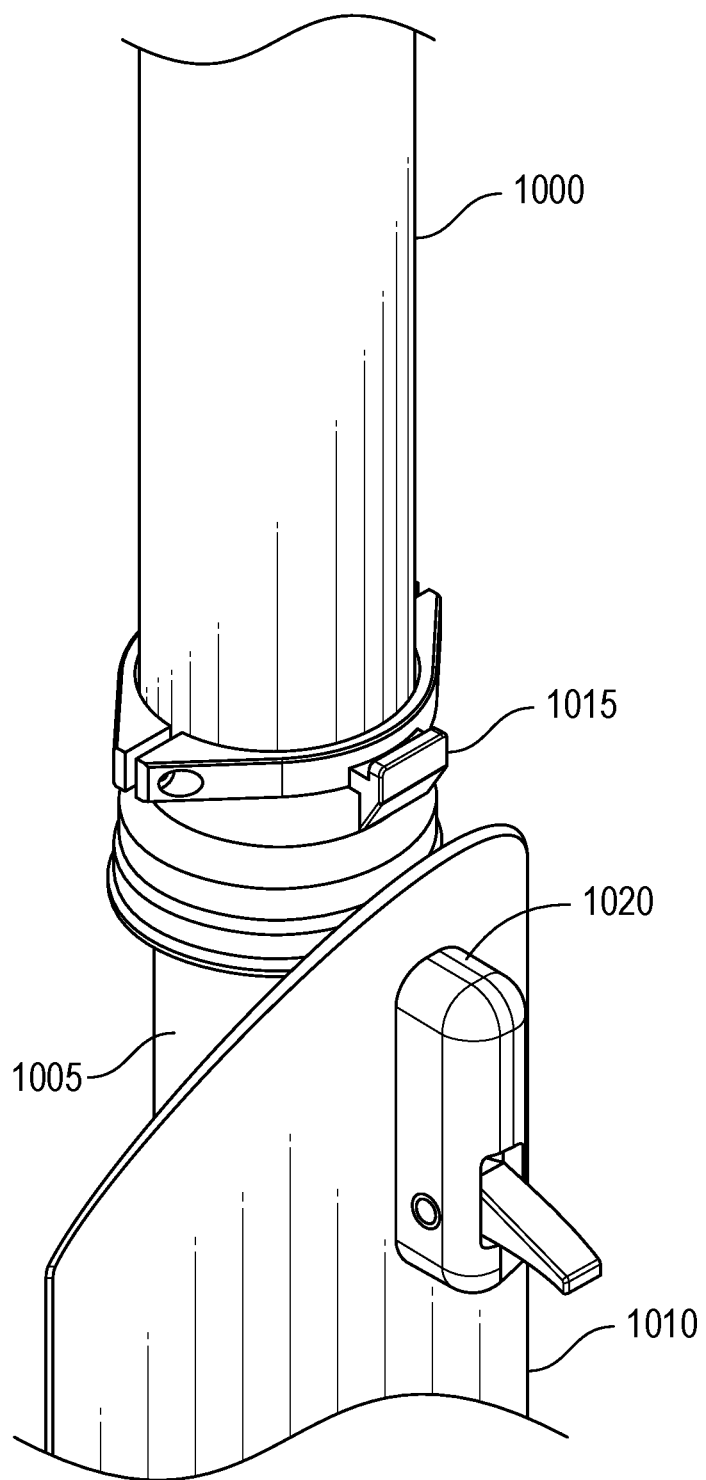
FIG. 10 shows an example of an automatic for suppression system according to aspects of the present disclosure.

FIG. 10 shows an example of an automatic for suppression system according to aspects of the present disclosure. The example shown includes upper fork tube 1000, lower fork tube 1005, fork guard 1010, fork ring 1015, and locking assembly 1020. In some aspects, the automatic fork suppression system of FIG. 10 may generally operate according to configurations and techniques described with reference to the automatic fork suppression system described in FIGS. 1-9.

Upper fork tube 1000 is an example of, or includes aspects of, the corresponding element described with reference to FIGS. 1, and 6-9. Lower fork tube 1005 is an example of, or includes aspects of, the corresponding element described with reference to FIGS. 1, and 7-9.

Fork guard 1010 is an example of, or includes aspects of, the corresponding element described with reference to FIGS. 1, and 6-9. Fork ring 1015 is an example of, or includes aspects of, the corresponding element described with reference to FIGS. 1, 2, 6-9, and 11. Locking assembly 1020 is an example of, or includes aspects of, the corresponding element described with reference to FIGS. 1, 3-9, and 12-18.

Figure 11:
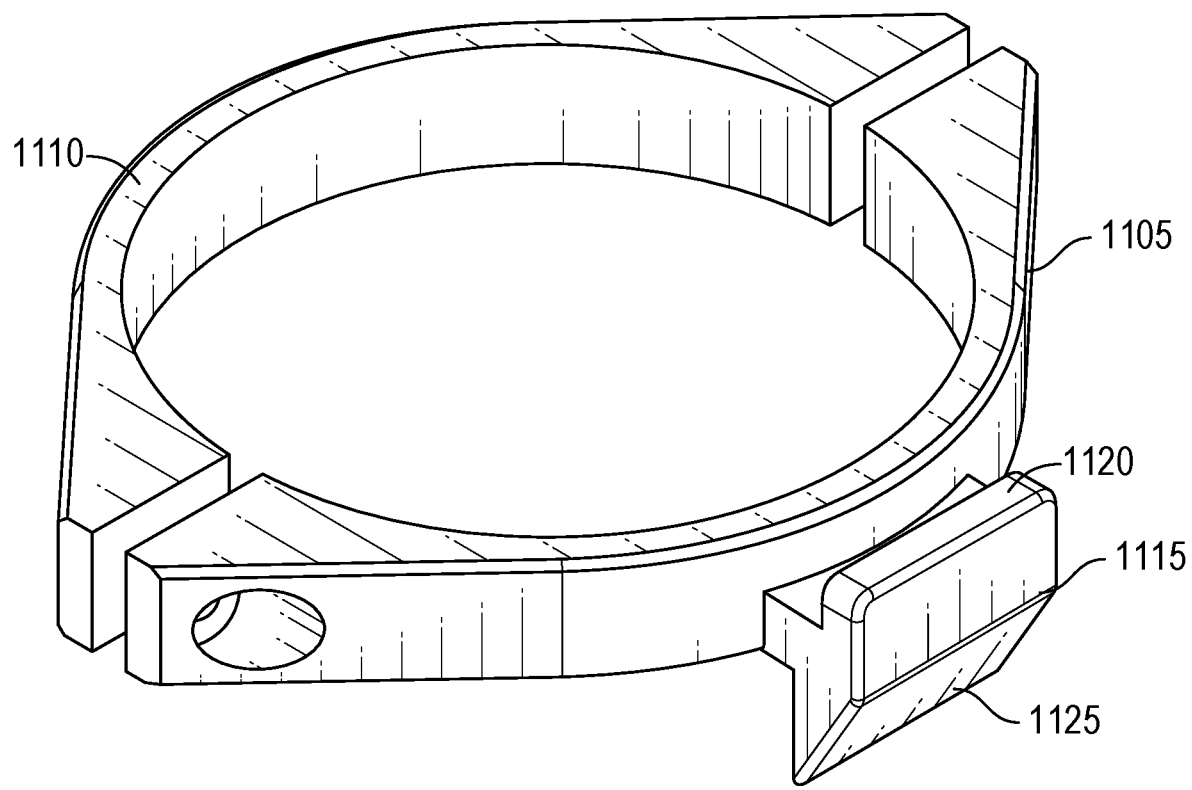
FIG. 11 shows an example of a fork ring according to aspects of the present disclosure.

FIG. 11 shows an example of a fork ring 1100 according to aspects of the present disclosure. FIG. 11 shows another embodiment of a fork ring 1100. In some aspects, the fork ring 1100 of FIG. 11 may generally operate according to configurations and techniques described with reference to the fork ring 1100 described in FIGS. 1-9. As shown in FIG. 11, the engagement portion 1115 of the fork ring 1100 may extend a smaller length around the circumference of the fork ring 1100 (e.g., as compared to the fork ring 1100 of FIG. 2). Additionally, the lip 1120 of the fork ring 1100 embodiment of FIG. 11 is straight, while the lip 1120 of the fork ring 1100 embodiment of FIG. 2 is curved and generally concentric to the inner curve of the fork ring 1100 front segment 1105.

Fork ring 1100 is an example of, or includes aspects of, the corresponding element described with reference to FIGS. 1, 2, and 6-10. In one embodiment, fork ring 1100 includes front segment 1105, rear segment 1110, and engagement portion 1115.

Front segment 1105 is an example of, or includes aspects of, the corresponding element described with reference to FIGS. 2 and 6. Rear segment 1110 is an example of, or includes aspects of, the corresponding element described with reference to FIGS. 2 and 6.

Engagement portion 1115 is an example of, or includes aspects of, the corresponding element described with reference to FIGS. 2, and 6-9. In one embodiment, engagement portion 1115 includes lip 1120 and sloped surface 1125. Lip 1120 is an example of, or includes aspects of, the corresponding element described with reference to FIGS. 2, and 7-9. Sloped surface 1125 is an example of, or includes aspects of, the corresponding element described with reference to FIG. 2.

Figure 12:
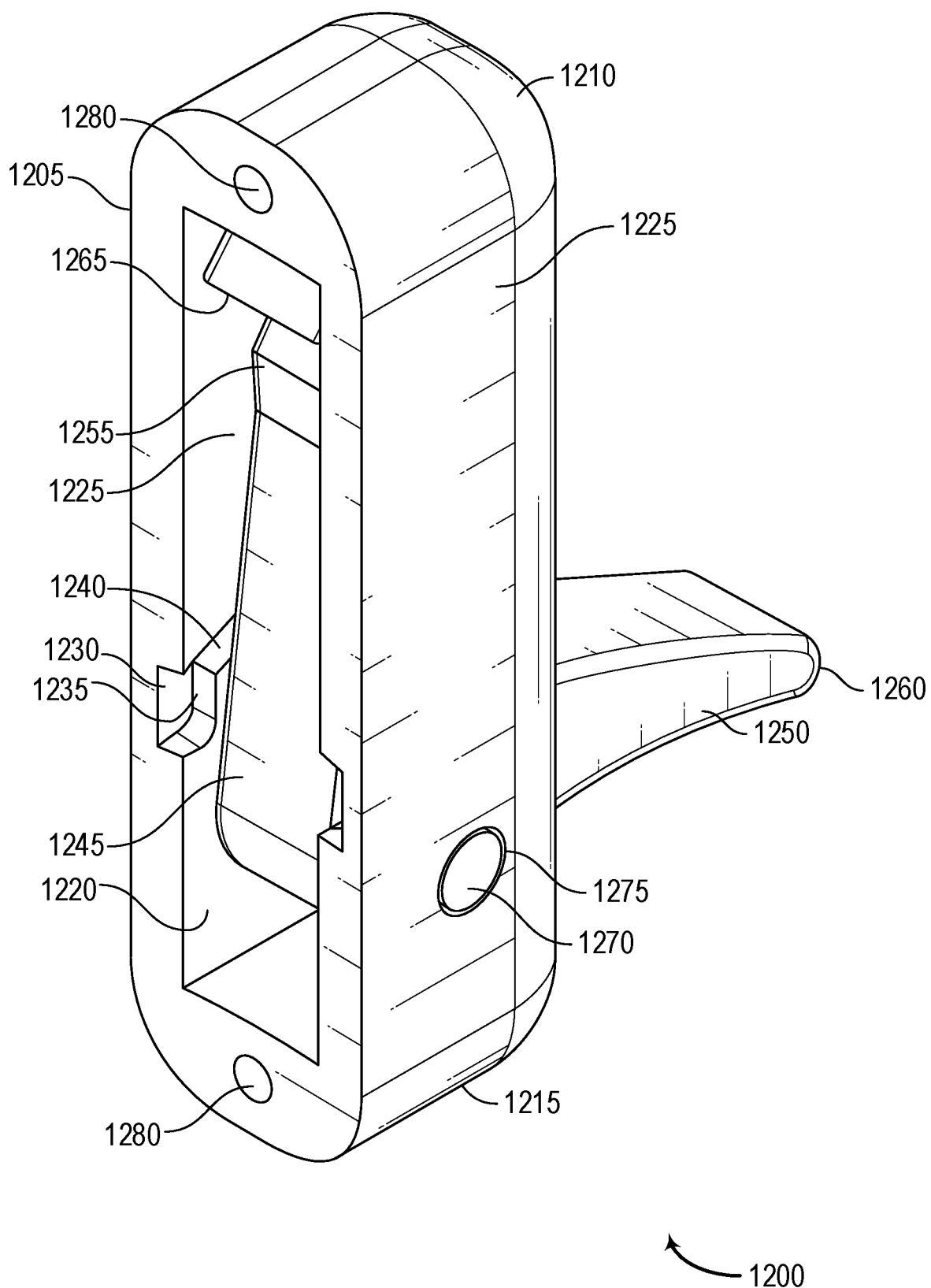
FIGS. 12 through 18 show examples of a locking assembly according to aspects of the present disclosure.

FIG. 12 shows an example of a locking assembly 1200 according to aspects of the present disclosure. FIG. 12 shows another embodiment of a locking assembly 1200. In some aspects, the locking assembly 1200 of FIG. 12 may generally operate according to configurations and techniques described with reference to the locking assembly 1200 described in FIGS. 1-9. FIG. 12 may also provide further illustration of one or more aspects of the automatic fork suppression method using the inventive system. FIG. 12 shows the locking assembly 1200 in the unlocked position. In the embodiment of FIG. 12, in lieu of the spring mechanism of the previous embodiment, the lever return mechanism comprises a first magnet coupled to a rear wall of the body 1205, and a second magnet coupled to the second end 1255 of the latch lever 1245. The magnets are of opposite poles such that the magnets attract. The attraction of the magnets retracts and holds the latch lever 1245 in the unlocked position.

Locking assembly 1200 is an example of, or includes aspects of, the corresponding element described with reference to FIGS. 1, 3-10, and 13-18. In one embodiment, locking assembly 1200 includes body 1205, side wall 1225, lock pin slot 1230, latch lever 1245, pivot pin 1270, pivot pin hole 1275, and fastener hole 1280.

Body 1205 is an example of, or includes aspects of, the corresponding element described with reference to FIGS. 3-5, 7-9, and 13-18. In one embodiment, body 1205 includes top end 1210, bottom end 1215, and cavity 1220. Top end 1210 is an example of, or includes aspects of, the corresponding element described with reference to FIGS. 4, 5, and 13-15. Bottom end 1215 is an example of, or includes aspects of, the corresponding element described with reference to FIGS. 4, 5, and 13-15.

Cavity 1220 is an example of, or includes aspects of, the corresponding element described with reference to FIGS. 4, 5, and 13-15. Side wall 1225 is an example of, or includes aspects of, the corresponding element described with reference to FIGS. 3, 4, and 13.

Lock pin slot 1230 is an example of, or includes aspects of, the corresponding element described with reference to FIGS. 3-5, and 13-15. In one embodiment, lock pin slot 1230 includes vertical portion 1235 and horizontal portion 1240.

Vertical portion 1235 is an example of, or includes aspects of, the corresponding element described with reference to FIGS. 4, and 13-15. Horizontal portion 1240 is an example of, or includes aspects of, the corresponding element described with reference to FIGS. 4, and 13-15.

Latch lever 1245 is an example of, or includes aspects of, the corresponding element described with reference to FIGS. 3-5, 7-9, and 13-18. In one embodiment, latch lever 1245 includes first end 1250, second end 1255, handle 1260, and catch 1265. First end 1250 is an example of, or includes aspects of, the corresponding element described with reference to FIGS. 4, 5, and 13-15. Second end 1255 is an example of, or includes aspects of, the corresponding element described with reference to FIGS. 4, 5, and 13-15.

Handle 1260 is an example of, or includes aspects of, the corresponding element described with reference to FIGS. 3-5, 7-9, and 13-18. Catch 1265 is an example of, or includes aspects of, the corresponding element described with reference to FIGS. 3-5, 7-9, and 13-18.

Pivot pin 1270 is an example of, or includes aspects of, the corresponding element described with reference to FIGS. 3-5, and 13-18. Pivot pin hole 1275 is an example of, or includes aspects of, the corresponding element described with reference to FIGS. 3-5, and 13-15. Fastener hole 1280 is an example of, or includes aspects of, the corresponding element described with reference to FIGS. 3-5, and 13-15.

Figure 13:
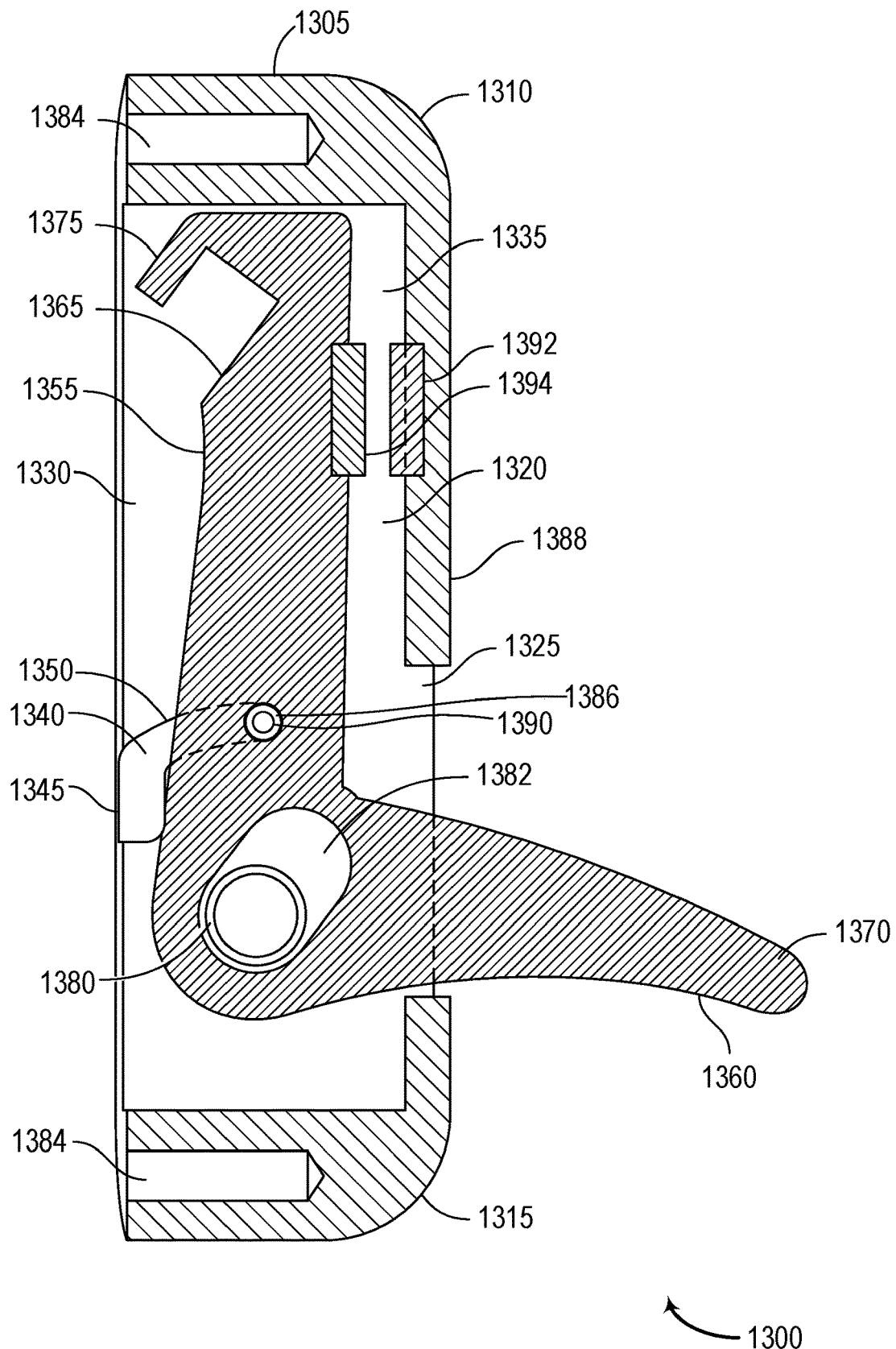

FIG. 13 shows an example of a locking assembly 1300 according to aspects of the present disclosure. FIG. 13 shows another embodiment of a locking assembly 1300. In some aspects, the locking assembly 1300 of FIG. 13 may generally operate according to configurations and techniques described with reference to the locking assembly 1300 described in FIGS. 1-9. FIG. 13 may also provide further illustration of one or more aspects of the automatic fork suppression method using the inventive system. FIG. 13 shows the locking assembly 1300 in the unlocked position. In the embodiment of FIG. 13, in lieu of the spring mechanism of the previous embodiment, the lever return mechanism here comprises a first magnet 1392 coupled to a rear wall 1388 of the body 1305, and a second magnet 1394 coupled to the second end 1365 of the latch lever 1355. The magnets are of opposite poles such that the magnets attract. The attraction of the magnets retracts and holds the latch lever 1355 in the unlocked position.

While the lock pin slots 1340 remain generally L-shaped, in this embodiment the generally horizontal portion 1350 extending towards the rear of the body 1305 is curved. The handle 1370 of the latch lever 1355 in this embodiment is oriented such that when the latch lever 1355 is in the unlocked position, the handle 1370 extends outward, resulting in the latch lever 1355 being generally an L-shape. The handle 1370 of the first embodiment extends generally downward.

Locking assembly 1300 is an example of, or includes aspects of, the corresponding element described with reference to FIGS. 1, 3-10, 12, and 14-18. In one embodiment, locking assembly 1300 includes body 1305, side wall 1335, lock pin slot 1340, latch lever 1355, pivot pin 1380, pivot pin hole 1382, fastener hole 1384, lock pin hole 1386, rear wall 1388, lock pin 1390, first magnet 1392, and second magnet 1394.

Body 1305 is an example of, or includes aspects of, the corresponding element described with reference to FIGS. 3-5, 7-9, 12, and 14-18. In one embodiment, body 1305 includes top end 1310, bottom end 1315, cavity 1320, first opening 1325, and second opening 1330.

Top end 1310 is an example of, or includes aspects of, the corresponding element described with reference to FIGS. 4, 5, 12, 14, and 15. Bottom end 1315 is an example of, or includes aspects of, the corresponding element described with reference to FIGS. 4, 5, 12, 14, and 15.

Cavity 1320 is an example of, or includes aspects of, the corresponding element described with reference to FIGS. 4, 5, 12, 14, and 15. First opening 1325 is an example of, or includes aspects of, the corresponding element described with reference to FIGS. 4, 5, 14, and 15. Second opening 1330 is an example of, or includes aspects of, the corresponding element described with reference to FIGS. 4, 5, 14, and 15.

Side wall 1335 is an example of, or includes aspects of, the corresponding element described with reference to FIGS. 3, 4, and 12. Lock pin slot 1340 is an example of, or includes aspects of, the corresponding element described with reference to FIGS. 3-5, 12, 14, and 15. In one embodiment, lock pin slot 1340 includes vertical portion 1345 and horizontal portion 1350.

Vertical portion 1345 is an example of, or includes aspects of, the corresponding element described with reference to FIGS. 4, 12, 14, and 15. Horizontal portion 1350 is an example of, or includes aspects of, the corresponding element described with reference to FIGS. 4, 12, 14, and 15.

Latch lever 1355 is an example of, or includes aspects of, the corresponding element described with reference to FIGS. 3-5, 7-9, 12, and 14-18. In one embodiment, latch lever 1355 includes first end 1360, second end 1365, handle 1370, and catch 1375.

First end 1360 is an example of, or includes aspects of, the corresponding element described with reference to FIGS. 4, 5, 12, 14, and 15. Second end 1365 is an example of, or includes aspects of, the corresponding element described with reference to FIGS. 4, 5, 12, 14, and 15. Handle 1370 is an example of, or includes aspects of, the corresponding element described with reference to FIGS. 3-5, 7-9, 12, and 14-18. Catch 1375 is an example of, or includes aspects of, the corresponding element described with reference to FIGS. 3-5, 7-9, 12, and 14-18.

Pivot pin 1380 is an example of, or includes aspects of, the corresponding element described with reference to FIGS. 3-5, 12, and 14-18. Pivot pin hole 1382 is an example of, or includes aspects of, the corresponding element described with reference to FIGS. 3-5, 12, 14, and 15.

Fastener hole 1384 is an example of, or includes aspects of, the corresponding element described with reference to FIGS. 3-5, 12, 14, and 15. Lock pin hole 1386 is an example of, or includes aspects of, the corresponding element described with reference to FIGS. 4, 5, 14, and 15.

Rear wall 1388 is an example of, or includes aspects of, the corresponding element described with reference to FIGS. 14 and 15.

In some examples, the locking mechanism includes a lock pin 1390 coupled to the latch lever 1355 and the body 1305 further including at least one lock pin slot 1340, where the locking assembly 1300 is configured such that at least one end of the lock pin 1390 is slidable along the lock pin slot 1340. In some examples, the resisting of the automatic restoring includes sliding of the lock pin 1390 to a vertical portion 1345 of the lock pin slot 1340.

Lock pin 1390 is an example of, or includes aspects of, the corresponding element described with reference to FIGS. 14, 15, 17, and 18. Lock pin hole 1386 is an example of, or includes aspects of, the corresponding element described with reference to FIGS. 4, 5, 14, and 15.

In some examples, the lever return mechanism includes a first magnet 1392 coupled to the body 1305 and a second magnet 1394 of opposite pole coupled to the latch lever 1355. First magnet 1392 is an example of, or includes aspects of, the corresponding element described with reference to FIGS. 14 and 15. Second magnet 1394 is an example of, or includes aspects of, the corresponding element described with reference to FIGS. 14 and 15.

Figure 14:
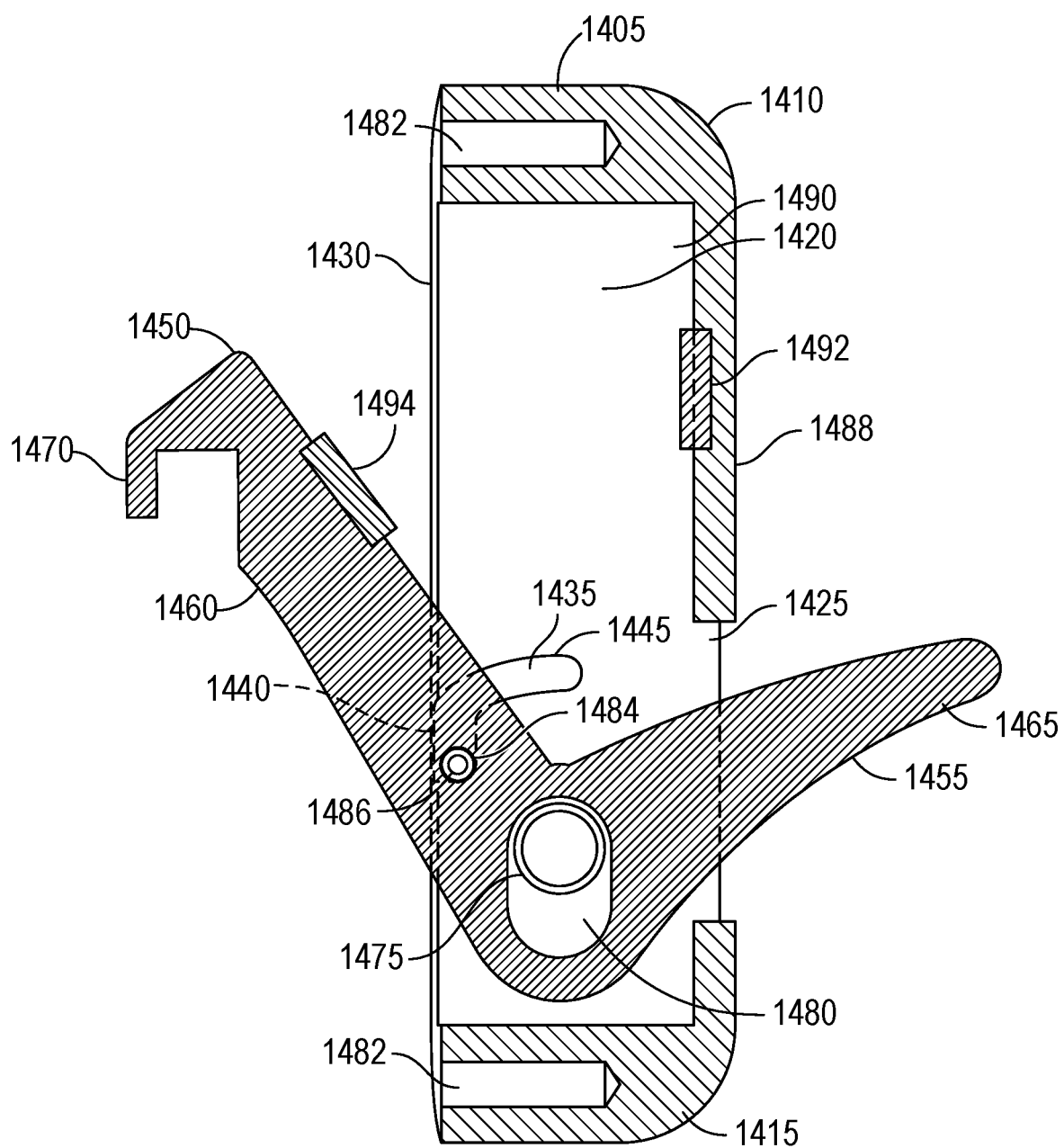

FIG. 14 shows an example of a locking assembly 1400 according to aspects of the present disclosure. FIG. 14 shows another embodiment of a locking assembly 1400. In some aspects, the locking assembly 1400 of FIG. 14 may generally operate according to configurations and techniques described with reference to the locking assembly 1400 described in FIGS. 1-9. FIG. 14 may also provide further illustration of one or more aspects of the automatic fork suppression method using the inventive system. FIG. 14 shows the locking assembly 1400 in the armed position. For clarity, the fork guard is not shown. In the embodiment of FIG. 14, in lieu of the spring mechanism of the previous embodiment, the lever return mechanism here comprises a first magnet 1492 coupled to a rear wall 1488 of the body 1405, and a second magnet 1494 coupled to the second end 1460 of the latch lever 1450. The magnets are of opposite poles such that the magnets attract. The attraction of the magnets retracts and holds the latch lever 1450 in the unlocked position. As in the previous embodiment (e.g., as described with reference to FIGS. 5 and 9), the rider may rotate the handle 1465, moving the catch 1470 into the armed position, overcoming the force of the lever return mechanism. The returning force of the lever return mechanism is resisted by the location of the lock pin 1486 in the vertical portion 1440 of the lock pin slot 1435.

Locking assembly 1400 is an example of, or includes aspects of, the corresponding element described with reference to FIGS. 1, 3-10, 12, 13, and 15-18. In one embodiment, locking assembly 1400 includes body 1405, lock pin slot 1435, latch lever 1450, pivot pin 1475, pivot pin hole 1480, fastener hole 1482, lock pin hole 1484, lock pin 1486, rear wall 1488, sidewall 1490, first magnet 1492, and second magnet 1494.

Body 1405 is an example of, or includes aspects of, the corresponding element described with reference to FIGS. 3-5, 7-9, 12, 13, and 15-18. In one embodiment, body 1405 includes top end 1410, bottom end 1415, cavity 1420, first opening 1425, and second opening 1430.

Top end 1410 is an example of, or includes aspects of, the corresponding element described with reference to FIGS. 4, 5, 12, 13, and 15. Bottom end 1415 is an example of, or includes aspects of, the corresponding element described with reference to FIGS. 4, 5, 12, 13, and 15. Cavity 1420 is an example of, or includes aspects of, the corresponding element described with reference to FIGS. 4, 5, 12, 13, and 15. First opening 1425 is an example of, or includes aspects of, the corresponding element described with reference to FIGS. 4, 5, 13, and 15. Second opening 1430 is an example of, or includes aspects of, the corresponding element described with reference to FIGS. 4, 5, 13, and 15.

Lock pin slot 1435 is an example of, or includes aspects of, the corresponding element described with reference to FIGS. 3-5, 12, 13, and 15. In one embodiment, lock pin slot 1435 includes vertical portion 1440 and horizontal portion 1445.

Vertical portion 1440 is an example of, or includes aspects of, the corresponding element described with reference to FIGS. 4, 12, 13, and 15. Horizontal portion 1445 is an example of, or includes aspects of, the corresponding element described with reference to FIGS. 4, 12, 13, and 15.

Latch lever 1450 is an example of, or includes aspects of, the corresponding element described with reference to FIGS. 3-5, 7-9, 12, 13, and 15-18. In one embodiment, latch lever 1450 includes first end 1455, second end 1460, handle 1465, and catch 1470. First end 1455 is an example of, or includes aspects of, the corresponding element described with reference to FIGS. 4, 5, 12, 13, and 15. Second end 1460 is an example of, or includes aspects of, the corresponding element described with reference to FIGS. 4, 5, 12, 13, and 15. Handle 1465 is an example of, or includes aspects of, the corresponding element described with reference to FIGS. 3-5, 7-9, 12, 13, and 15-18. Catch 1470 is an example of, or includes aspects of, the corresponding element described with reference to FIGS. 3-5, 7-9, 12, 13, and 15-18.

Pivot pin 1475 is an example of, or includes aspects of, the corresponding element described with reference to FIGS. 3-5, 12, 13, and 15-18. Pivot pin hole 1480 is an example of, or includes aspects of, the corresponding element described with reference to FIGS. 3-5, 12, 13, and 15.

Fastener hole 1482 is an example of, or includes aspects of, the corresponding element described with reference to FIGS. 3-5, 12, 13, and 15. Lock pin hole 1484 is an example of, or includes aspects of, the corresponding element described with reference to FIGS. 4, 5, 13, and 15. Lock pin 1486 is an example of, or includes aspects of, the corresponding element described with reference to FIGS. 13, 15, 17, and 18.

Rear wall 1488 is an example of, or includes aspects of, the corresponding element described with reference to FIGS. 13 and 15. Sidewall 1490 is an example of, or includes aspects of, the corresponding element described with reference to FIG. 15.

First magnet 1492 is an example of, or includes aspects of, the corresponding element described with reference to FIGS. 13 and 15. Second magnet 1494 is an example of, or includes aspects of, the corresponding element described with reference to FIGS. 13 and 15.

Figure 15:
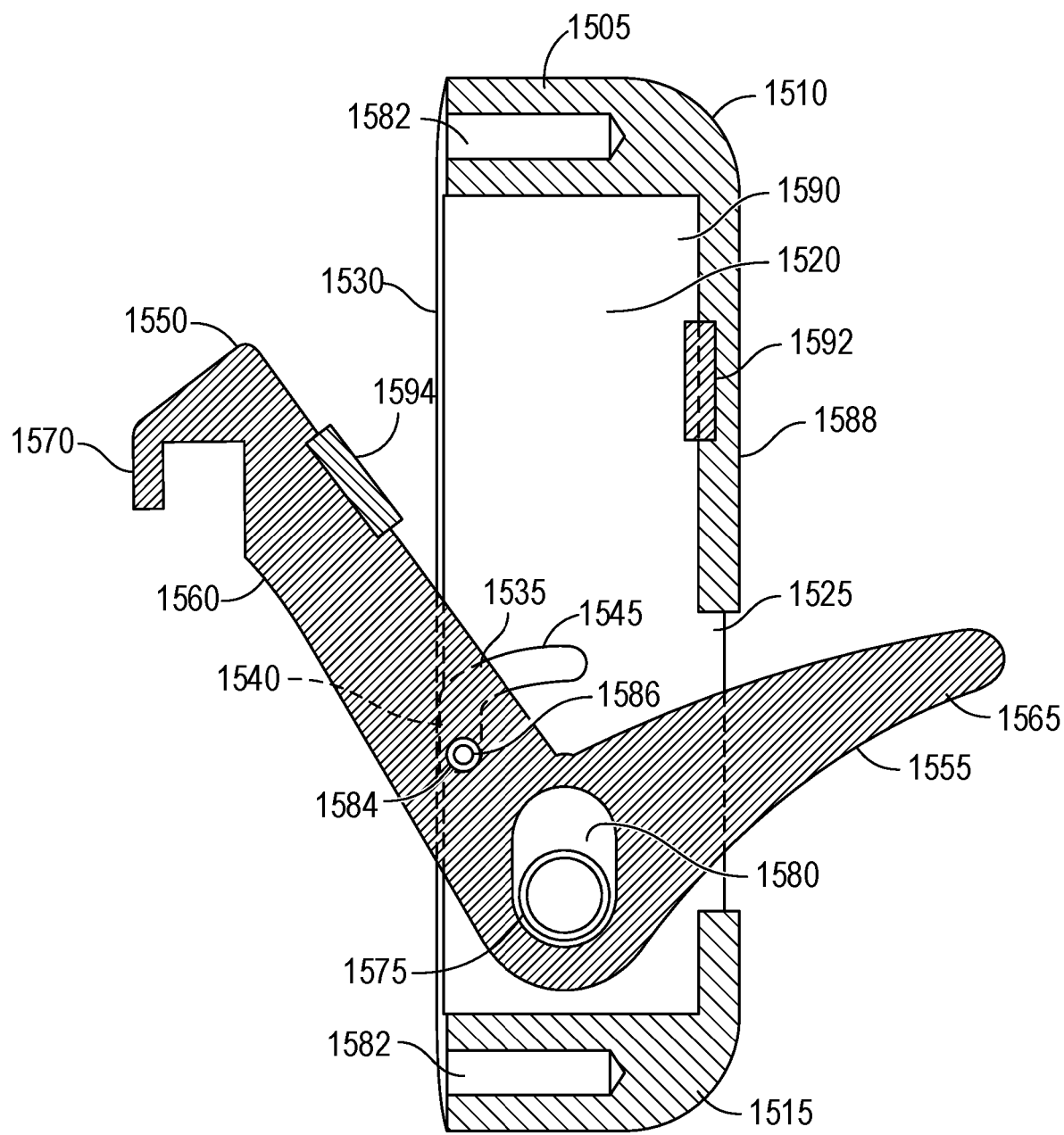

FIG. 15 shows an example of a locking assembly 1500 according to aspects of the present disclosure. FIG. 15 shows the locking assembly 1500 in the engaged position, where the lip of the fork ring has engaged with the catch 1570 of the latch lever 1550 and moved upwards. For clarity the fork guard and the fork ring are not shown. The upward motion of the fork ring has moved the latch lever 1550 upwards as far as permitted by the combination of the slotted pivot pin hole 1580 in the latch lever 1550 and the vertical portion 1540 of the lock pin slot 1535. The upwards movement locates the lock pin 1586 at the junction between the vertical portion 1540 of the lock pin slot 1535 and the generally horizontal portion 1545 of the lock pin slot 1535. At this point, the lock pin slot 1535 no longer prevents the latch lever 1550 from returning to the unlocked position, but the engagement of the fork ring lip with the catch 1570 still prevents the latch lever 1550 from returning to the unlocked position. As a result, the next time the fork ring moves downwards, which results in the fork ring disengaging from the catch 1570, the force of the lever return mechanism (in this embodiment the magnets) is no longer resisted, and the latch lever 1550 automatically returns to the original unlocked position.

Locking assembly 1500 is an example of, or includes aspects of, the corresponding element described with reference to FIGS. 1, 3-10, 12-14, and 16-18. In one embodiment, locking assembly 1500 includes body 1505, lock pin slot 1535, latch lever 1550, pivot pin 1575, pivot pin hole 1580, fastener hole 1582, lock pin hole 1584, lock pin 1586, rear wall 1588, sidewall 1590, first magnet 1592, and second magnet 1594.

Body 1505 is an example of, or includes aspects of, the corresponding element described with reference to FIGS. 3-5, 7-9, 12-14, and 16-18. In one embodiment, body 1505 includes top end 1510, bottom end 1515, cavity 1520, first opening 1525, and second opening 1530.

Top end 1510 is an example of, or includes aspects of, the corresponding element described with reference to FIGS. 4, 5, and 12-14. Bottom end 1515 is an example of, or includes aspects of, the corresponding element described with reference to FIGS. 4, 5, and 12-14.

Cavity 1520 is an example of, or includes aspects of, the corresponding element described with reference to FIGS. 4, 5, and 12-14.

First opening 1525 is an example of, or includes aspects of, the corresponding element described with reference to FIGS. 4, 5, 13, and 14. Second opening 1530 is an example of, or includes aspects of, the corresponding element described with reference to FIGS. 4, 5, 13, and 14.

Lock pin slot 1535 is an example of, or includes aspects of, the corresponding element described with reference to FIGS. 3-5, and 12-14. In one embodiment, lock pin slot 1535 includes vertical portion 1540 and horizontal portion 1545.

Vertical portion 1540 is an example of, or includes aspects of, the corresponding element described with reference to FIGS. 4, and 12-14. Horizontal portion 1545 is an example of, or includes aspects of, the corresponding element described with reference to FIGS. 4, and 12-14.

Latch lever 1550 is an example of, or includes aspects of, the corresponding element described with reference to FIGS. 3-5, 7-9, 12-14, and 16-18. In one embodiment, latch lever 1550 includes first end 1555, second end 1560, handle 1565, and catch 1570. First end 1555 is an example of, or includes aspects of, the corresponding element described with reference to FIGS. 4, 5, and 12-14. Second end 1560 is an example of, or includes aspects of, the corresponding element described with reference to FIGS. 4, 5, and 12-14.

Handle 1565 is an example of, or includes aspects of, the corresponding element described with reference to FIGS. 3-5, 7-9, 12-14, and 16-18. Catch 1570 is an example of, or includes aspects of, the corresponding element described with reference to FIGS. 3-5, 7-9, 12-14, and 16-18.

Pivot pin 1575 is an example of, or includes aspects of, the corresponding element described with reference to FIGS. 3-5, 12-14, and 16-18. Pivot pin hole 1580 is an example of, or includes aspects of, the corresponding element described with reference to FIGS. 3-5, and 12-14.

Fastener hole 1582 is an example of, or includes aspects of, the corresponding element described with reference to FIGS. 3-5, and 12-14. Lock pin hole 1584 is an example of, or includes aspects of, the corresponding element described with reference to FIGS. 4, 5, 13, and 14. Lock pin 1586 is an example of, or includes aspects of, the corresponding element described with reference to FIGS. 13, 14, 17, and 18.

Rear wall 1588 is an example of, or includes aspects of, the corresponding element described with reference to FIGS. 13 and 14. Sidewall 1590 is an example of, or includes aspects of, the corresponding element described with reference to FIG. 14.

First magnet 1592 is an example of, or includes aspects of, the corresponding element described with reference to FIGS. 13 and 14. Second magnet 1594 is an example of, or includes aspects of, the corresponding element described with reference to FIGS. 13 and 14.

Figure 16:
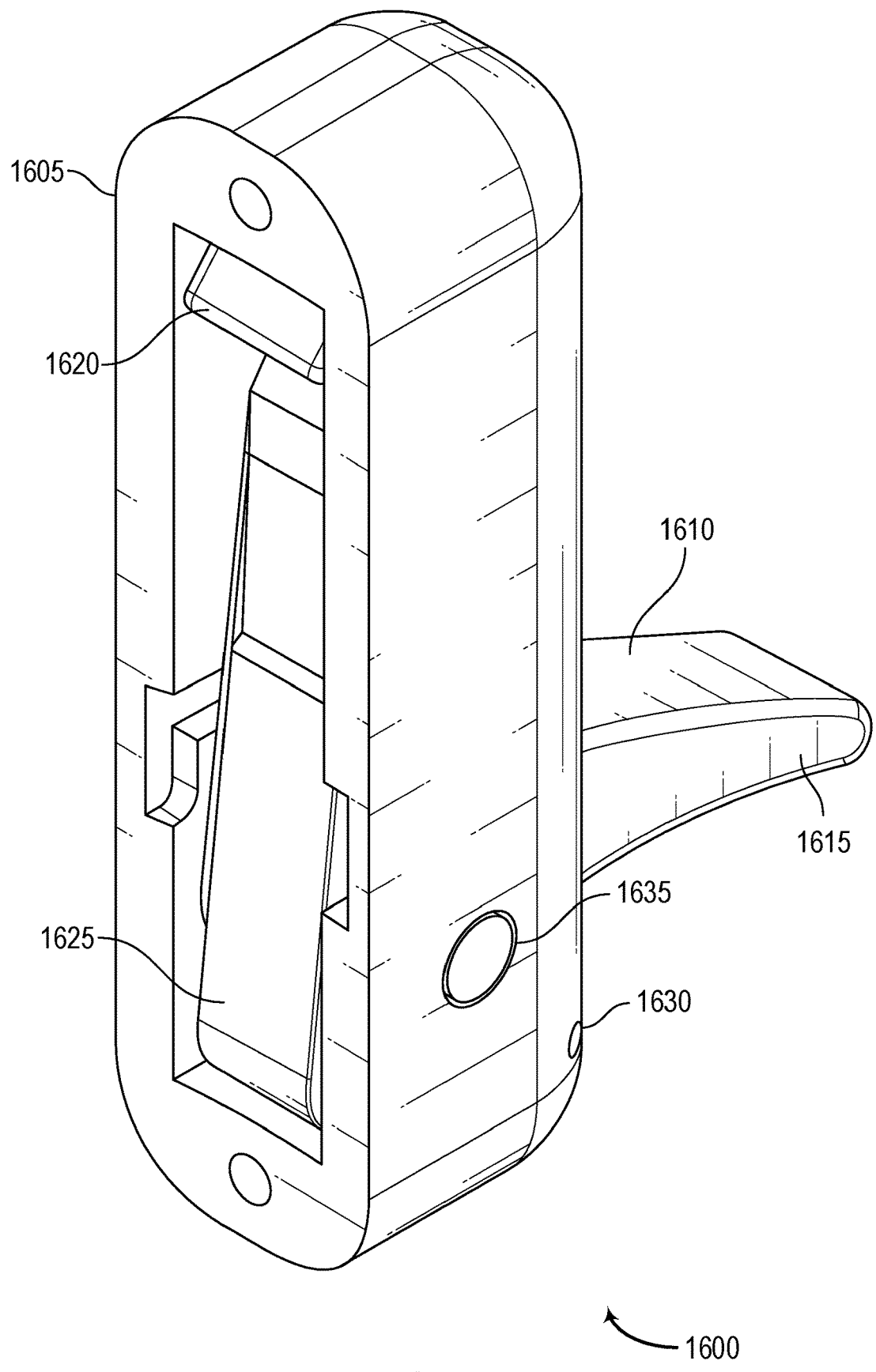

FIG. 16 shows an example of a locking assembly 1600 according to aspects of the present disclosure. FIG. 16 illustrates the locking assembly 1600 with another lever return mechanism embodiment. As shown in FIG. 16, the lever return mechanism comprises a flat spring 1625 comprising a flexible plate and a holding pin 1630. The flexible plate may be generally L-shaped when in the non-biased position. The flat spring 1625 is coupled to the body 1605 at one end of the flat spring 1625 by the holding pin 1630. FIG. 16 shows the lever return mechanism with the latch lever 1610 in the unlocked position. The flat spring 1625 does not exert a restoring force on the latch lever 1610 in this position.

Locking assembly 1600 is an example of, or includes aspects of, the corresponding element described with reference to FIGS. 1, 3-10, 12-15, 17, and 18. In one embodiment, locking assembly 1600 includes body 1605, latch lever 1610, flat spring 1625, holding pin 1630, and pivot pin 1635.

Body 1605 is an example of, or includes aspects of, the corresponding element described with reference to FIGS. 3-5, 7-9, 12-15, 17, and 18. Latch lever 1610 is an example of, or includes aspects of, the corresponding element described with reference to FIGS. 3-5, 7-9, 12-15, 17, and 18. In one embodiment, latch lever 1610 includes handle 1615 and catch 1620.

Handle 1615 is an example of, or includes aspects of, the corresponding element described with reference to FIGS. 3-5, 7-9, 12-15, 17, and 18. Catch 1620 is an example of, or includes aspects of, the corresponding element described with reference to FIGS. 3-5, 7-9, 12-15, 17, and 18. In some examples, the lever return mechanism includes a flat spring 1625 and a holding pin 1630.

Flat spring 1625 is an example of, or includes aspects of, the corresponding element described with reference to FIGS. 17 and 18. Holding pin 1630 is an example of, or includes aspects of, the corresponding element described with reference to FIGS. 17 and 18. Pivot pin 1635 is an example of, or includes aspects of, the corresponding element described with reference to FIGS. 3-5, 12-15, 17, and 18.

Figure 17:
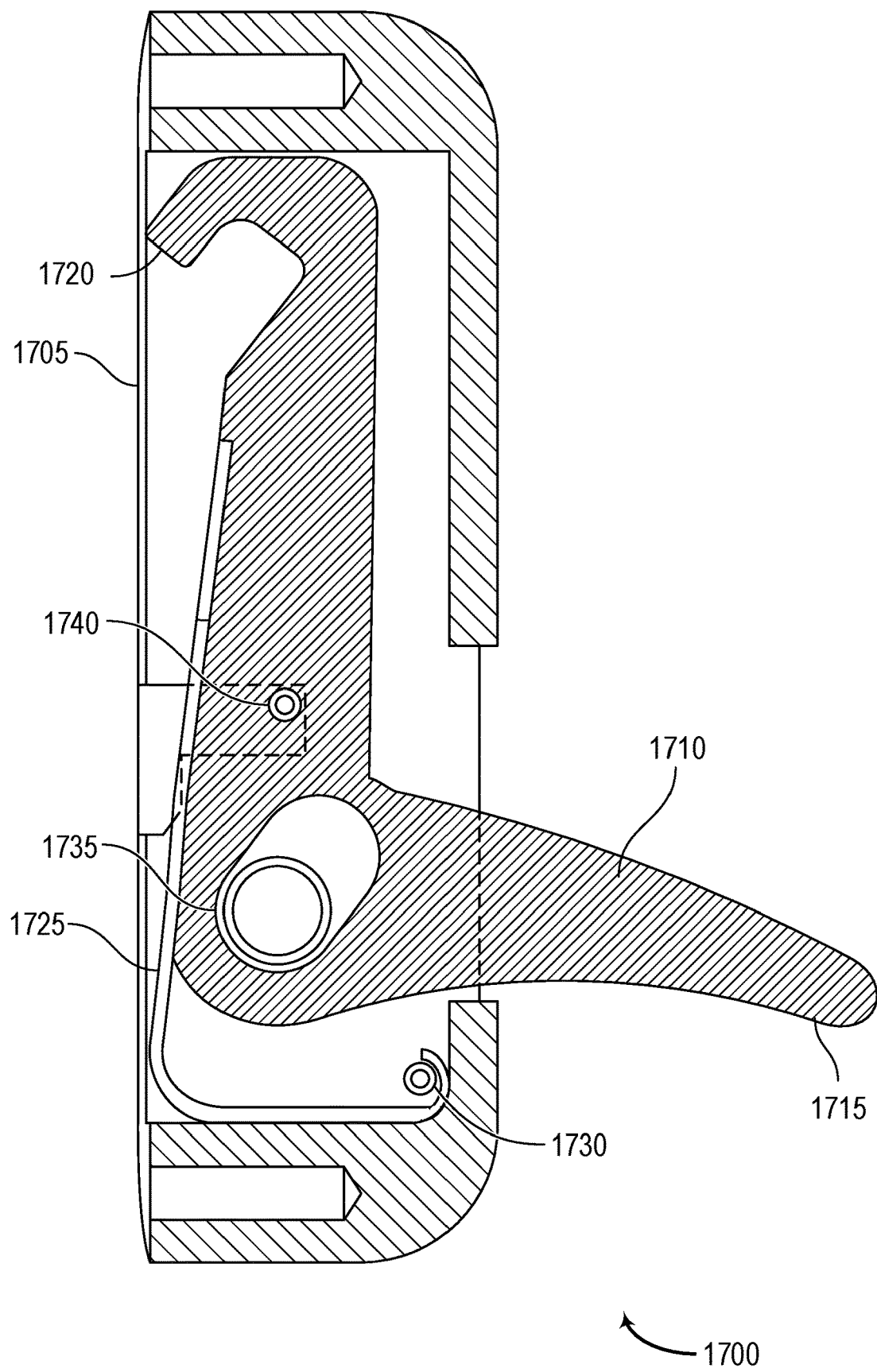

FIG. 17 shows an example of a locking assembly 1700 according to aspects of the present disclosure. FIG. 17 illustrates the locking assembly 1700 with another lever return mechanism embodiment. As shown in FIG. 17, the lever return mechanism comprises a flat spring 1725 comprising a flexible plate and a holding pin 1730. The flexible plate may be generally L-shaped when in the non-biased position. The flat spring 1725 is coupled to the body 1705 at one end of the flat spring 1725 by the holding pin 1730. FIG. 17 shows the lever return mechanism with the latch lever 1710 in the unlocked position. The flat spring 1725 does not exert a restoring force on the latch lever 1710 in this position.

Locking assembly 1700 is an example of, or includes aspects of, the corresponding element described with reference to FIGS. 1, 3-10, 12-16, and 18. In one embodiment, locking assembly 1700 includes body 1705, latch lever 1710, flat spring 1725, holding pin 1730, pivot pin 1735, and lock pin 1740. Body 1705 is an example of, or includes aspects of, the corresponding element described with reference to FIGS. 3-5, 7-9, 12-16, and 18.

Latch lever 1710 is an example of, or includes aspects of, the corresponding element described with reference to FIGS. 3-5, 7-9, 12-16, and 18. In one embodiment, latch lever 1710 includes handle 1715 and catch 1720.

Handle 1715 is an example of, or includes aspects of, the corresponding element described with reference to FIGS. 3-5, 7-9, 12-16, and 18. Catch 1720 is an example of, or includes aspects of, the corresponding element described with reference to FIGS. 3-5, 7-9, 12-16, and 18.

Flat spring 1725 is an example of, or includes aspects of, the corresponding element described with reference to FIGS. 16 and 18. Holding pin 1730 is an example of, or includes aspects of, the corresponding element described with reference to FIGS. 16 and 18.

Pivot pin 1735 is an example of, or includes aspects of, the corresponding element described with reference to FIGS. 3-5, 12-16, and 18. Lock pin 1740 is an example of, or includes aspects of, the corresponding element described with reference to FIGS. 13-15, and 18.

Figure 18:
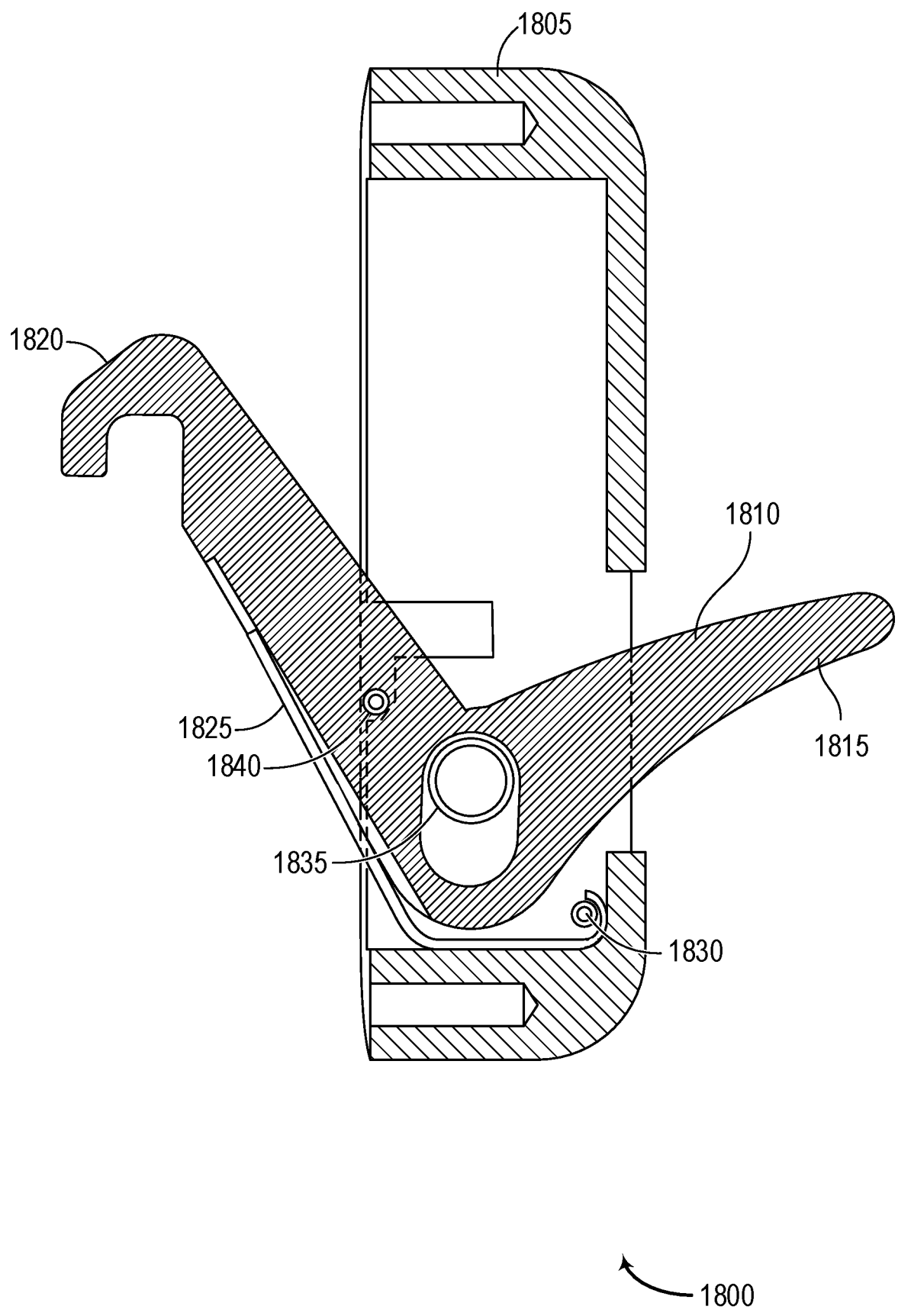

FIG. 18 shows an example of a locking assembly 1800 according to aspects of the present disclosure. FIG. 18 illustrates the locking assembly 1800 with another lever return mechanism embodiment. As shown in FIG. 18, the lever return mechanism comprises a flat spring 1825 comprising a flexible plate and a holding pin 1830. The flexible plate may be generally L-shaped when in the non-biased position. The flat spring 1825 is coupled to the body 1805 at one end of the flat spring 1825 by the holding pin 1830. FIG. 18 shows the latch lever 1810 in the armed position. In this position, the flat spring 1825 exerts a rearward restoring force on the lever. When the latch lever 1810 is released from engagement with the fork spring, the flat spring 1825 restoring force will automatically move the latch lever 1810 back to the unlocked position (e.g., the unlocked positions shown in FIGS. 16 and 17).

Locking assembly 1800 is an example of, or includes aspects of, the corresponding element described with reference to FIGS. 1, 3-10, and 12-17. In one embodiment, locking assembly 1800 includes body 1805, latch lever 1810, flat spring 1825, holding pin 1830, pivot pin 1835, and lock pin 1840.

Body 1805 is an example of, or includes aspects of, the corresponding element described with reference to FIGS. 3-5, 7-9, and 12-17. Latch lever 1810 is an example of, or includes aspects of, the corresponding element described with reference to FIGS. 3-5, 7-9, and 12-17. In one embodiment, latch lever 1810 includes handle 1815 and catch 1820.

Handle 1815 is an example of, or includes aspects of, the corresponding element described with reference to FIGS. 3-5, 7-9, and 12-17. Catch 1820 is an example of, or includes aspects of, the corresponding element described with reference to FIGS. 3-5, 7-9, and 12-17.

Flat spring 1825 is an example of, or includes aspects of, the corresponding element described with reference to FIGS. 16 and 17. Holding pin 1830 is an example of, or includes aspects of, the corresponding element described with reference to FIGS. 16 and 17. Pivot pin 1835 is an example of, or includes aspects of, the corresponding element described with reference to FIGS. 3-5, and 12-17. Lock pin 1840 is an example of, or includes aspects of, the corresponding element described with reference to FIGS. 13-15, and 17.

Figure 19:
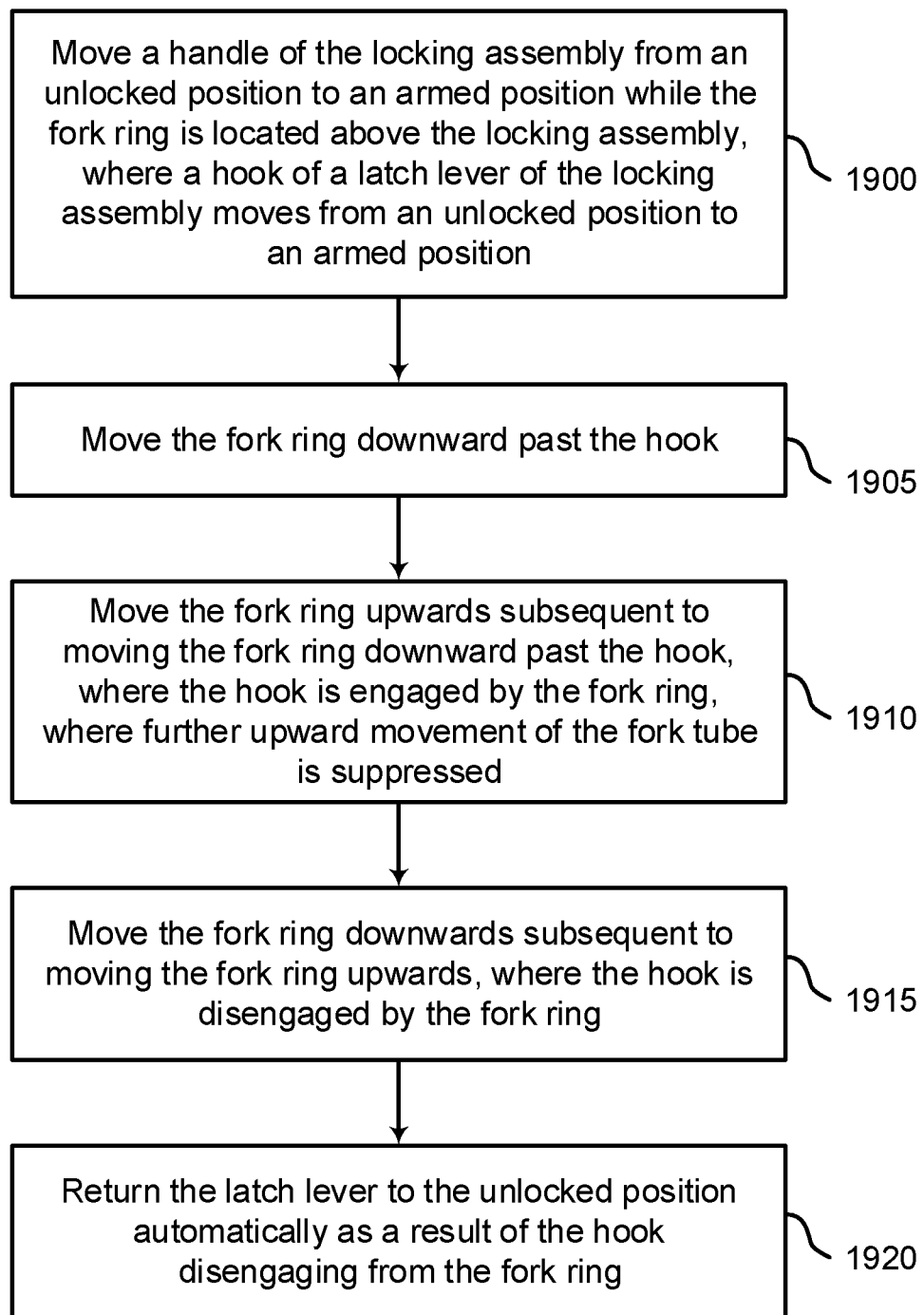
FIGS. 19 through 20 show examples of a process for an automatic fork suppression system for a motorcycle according to aspects of the present disclosure.

FIG. 19 shows an example of a process for an automatic fork suppression system for a motorcycle according to aspects of the present disclosure. Generally, these operations are performed according to the methods and processes described in accordance with aspects of the present disclosure. In some cases, the operations described herein are composed of various substeps, or are performed in conjunction with other operations.

At operation 1900, the system moves a handle of the locking assembly from an unlocked position to an armed position while the fork ring is located above the locking assembly, where a catch of a latch lever of the locking assembly moves from an unlocked position to an armed position. In some cases, the operations of this step refer to, or may be performed by, a handle as described with reference to FIGS. 3-5, 7-9, and 12-18.

At operation 1905, the system moves the fork ring downward past the catch. In some cases, the operations of this step refer to, or may be performed by, a fork ring as described with reference to FIGS. 1, 2, and 6-11.

At operation 1910, the system moves the fork ring upwards subsequent to moving the fork ring downward past the catch, where the catch is engaged by the fork ring, where further upward movement of the fork tube is suppressed. In some cases, the operations of this step refer to, or may be performed by, a fork ring as described with reference to FIGS. 1, 2, and 6-11.

At operation 1915, the system moves the fork ring downwards subsequent to moving the fork ring upwards, where the catch is disengaged by the fork ring. In some cases, the operations of this step refer to, or may be performed by, a fork ring as described with reference to FIGS. 1, 2, and 6-11.

At operation 1920, the system returns the latch lever to the unlocked position automatically as a result of the catch disengaging from the fork ring. In some cases, the operations of this step refer to, or may be performed by, a latch lever as described with reference to FIGS. 3-5, 7-9, and 12-18.

Figure 20:
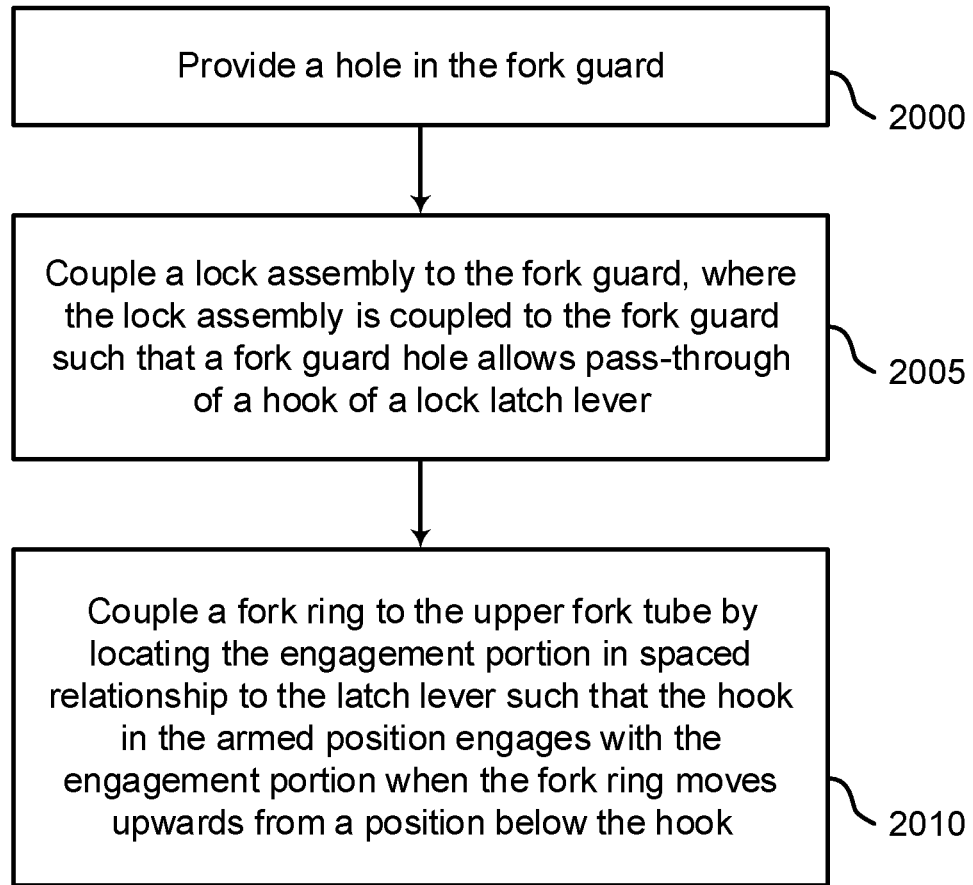

FIG. 20 shows an example of a process for an automatic fork suppression system for a motorcycle according to aspects of the present disclosure. Generally, these operations are performed according to the methods and processes described in accordance with aspects of the present disclosure. In some cases, the operations described herein are composed of various substeps, or are performed in conjunction with other operations.

At operation 2000, the system provides a hole in the fork guard. In some cases, the operations of this step refer to, or may be performed by, a fork guard hole as described with reference to FIGS. 7 and 8.

At operation 2005, the system couples a lock assembly to the fork guard, where the lock assembly includes a body and a latch lever pivotably coupled to the body such that the latch lever is movable between an unlocked position and an armed position, the latch lever coupled to a locking mechanism and having a catch at a first end of the latch lever and a handle at a second end of the latch lever, where the lock assembly is coupled to the fork guard such that the fork guard hole allows pass-through of the catch of the lock latch lever. In some cases, the operations of this step refer to, or may be performed by, a locking assembly as described with reference to FIGS. 1, 3-10, and 12-18.

At operation 2010, the system couples a fork ring to the upper fork tube, the fork ring having an engagement portion configured to engage with the catch when the latch lever is in the armed position, where the coupling includes locating the engagement portion in spaced relationship to the latch lever such that the catch in the armed position engages with the engagement portion when the fork ring moves upwards from a position below the catch. In some cases, the operations of this step refer to, or may be performed by, a upper fork tube as described with reference to FIGS. 1, and 6-10.

Accordingly, the present disclosure includes the following embodiments.

An apparatus for an automatic fork suppression system for a motorcycle is described. Embodiments of the apparatus include a fork ring coupled to a fork tube of the motorcycle and a locking assembly coupled to a fork guard of the motorcycle such that a portion of the locking assembly may pass through the fork guard, wherein the locking assembly is in spaced relationship to the fork ring, the locking assembly comprising a body configured to couple to the fork guard; a latch lever movably coupled to the body and including a first end having a handle and a second end having a catch, wherein the latch lever is coupled to the body such that the latch lever is movable between an unlocked position, an armed position, and an engaged position, the spaced relationship further comprising the catch being engaged by an engagement portion of the fork ring when the latch lever is in the armed position and the fork ring moves below the catch and subsequently moves upwards; a lever return mechanism configured to automatically restore the latch lever to the unlocked position; and a locking mechanism configured to resist the automatic restoring of the latch lever to the unlocked position when the latch lever is in the armed position, wherein when the latch lever is moves from the unlocked position to the armed position the latch lever is maintained in the armed position prior to engagement by the fork ring.

An system for an automatic fork suppression system for a motorcycle, comprising: a fork ring coupled to a fork tube of the motorcycle and a locking assembly coupled to a fork guard of the motorcycle such that a portion of the locking assembly may pass through the fork guard, wherein the locking assembly is in spaced relationship to the fork ring, the locking assembly comprising a body configured to couple to the fork guard; a latch lever movably coupled to the body and including a first end having a handle and a second end having a catch, wherein the latch lever is coupled to the body such that the latch lever is movable between an unlocked position, an armed position, and an engaged position, the spaced relationship further comprising the catch being engaged by an engagement portion of the fork ring when the latch lever is in the armed position and the fork ring moves below the catch and subsequently moves upwards; a lever return mechanism configured to automatically restore the latch lever to the unlocked position; and a locking mechanism configured to resist the automatic restoring of the latch lever to the unlocked position when the latch lever is in the armed position, wherein when the latch lever is moves from the unlocked position to the armed position the latch lever is maintained in the armed position prior to engagement by the fork ring.

A method of manufacturing an apparatus for an automatic fork suppression system for a motorcycle is described. The method includes manufacturing a fork ring coupled to a fork tube of the motorcycle and a locking assembly coupled to a fork guard of the motorcycle such that a portion of the locking assembly may pass through the fork guard, wherein the locking assembly is in spaced relationship to the fork ring, the locking assembly comprising a body configured to couple to the fork guard; a latch lever movably coupled to the body and including a first end having a handle and a second end having a catch, wherein the latch lever is coupled to the body such that the latch lever is movable between an unlocked position, an armed position, and an engaged position, the spaced relationship further comprising the catch being engaged by an engagement portion of the fork ring when the latch lever is in the armed position and the fork ring moves below the catch and subsequently moves upwards; a lever return mechanism configured to automatically restore the latch lever to the unlocked position; and a locking mechanism configured to resist the automatic restoring of the latch lever to the unlocked position when the latch lever is in the armed position, wherein when the latch lever is moves from the unlocked position to the armed position the latch lever is maintained in the armed position prior to engagement by the fork ring.

A method of using an apparatus for an automatic fork suppression system for a motorcycle is described. The method includes using a fork ring coupled to a fork tube of the motorcycle and a locking assembly coupled to a fork guard of the motorcycle such that a portion of the locking assembly may pass through the fork guard, wherein the locking assembly is in spaced relationship to the fork ring, the locking assembly comprising a body configured to couple to the fork guard; a latch lever movably coupled to the body and including a first end having a handle and a second end having a catch, wherein the latch lever is coupled to the body such that the latch lever is movable between an unlocked position, an armed position, and an engaged position, the spaced relationship further comprising the catch being engaged by an engagement portion of the fork ring when the latch lever is in the armed position and the fork ring moves below the catch and subsequently moves upwards; a lever return mechanism configured to automatically restore the latch lever to the unlocked position; and a locking mechanism configured to resist the automatic restoring of the latch lever to the unlocked position when the latch lever is in the armed position, wherein when the latch lever is moves from the unlocked position to the armed position the latch lever is maintained in the armed position prior to engagement by the fork ring.

In some examples, the body is configured to couple to an outer surface of the fork guard. In some examples, the fork ring is configured to encircle the fork tube. In some examples, the body includes an interior cavity, and wherein the catch resides entirely within the cavity when the latch lever is in the unlocked position.

Some examples of the apparatus, system, and method described above further include a top end and a bottom end of the body are each configured to receive a fastener.

In some examples, the lever return mechanism comprises a first magnet coupled to the body and a second magnet of opposite pole coupled to the latch lever. In some examples, the lever return mechanism comprises a coiled spring. In some examples, the lever return mechanism comprises a flat spring and a holding pin.

In some examples, the body includes a cavity and the movable coupling of the latch lever to the body includes a slotted through-hole in the latch lever and a pivot pin spanning the cavity, wherein the latch lever is movably coupled to the body by the pivot pin passing through the slotted through-hole such that at least a portion of the latch lever resides within the cavity.

In some examples, the locking mechanism comprises a lock pin coupled to the latch lever and the body further comprising at least one lock pin slot, wherein the locking assembly is configured such that at least one end of the lock pin is slidable along the lock pin slot.

In some examples, the resisting of the automatic restoring comprises sliding of the lock pin to a vertical portion of the lock pin slot.

A method for an automatic fork suppression system for a motorcycle is described. Embodiments of the method include moving a handle of the locking assembly from an unlocked position to an armed position while the fork ring is located above the locking assembly, wherein a catch of a latch lever of the locking assembly moves from an unlocked position to an armed position, moving of the fork ring downward past the catch, moving of the fork ring upwards subsequent to moving the fork ring downward past the catch, wherein the catch is engaged by the fork ring, wherein further upward movement of the fork tube is suppressed, moving of the fork ring downwards subsequent to moving the fork ring upwards, wherein the catch is disengaged by the fork ring, and returning of the latch lever to the unlocked position automatically as a result of the catch disengaging from the fork ring.

In some examples, the unlocked position includes the catch being contained within a cavity of a body of the locking mechanism. In some examples, the moving of the catch from the unlocked position to the armed position includes the catch exiting the cavity towards the fork tube.

In some examples, the body is configured to couple to an outer surface of the fork guard.

In some examples, the automatic returning is executed by a lever return mechanism of the locking assembly. In some examples, the lever return mechanism comprises a spring coupled to the latch lever. In some examples, the locking assembly further comprises a locking mechanism configured to resist the execution of the lever return mechanism prior to the engagement of the catch by the fork ring.

In some examples, the locking mechanism comprises a lock pin coupled to the latch lever and at least one lock pin slot in the body, wherein each lock pin slot of the body receives one end of the lock pin, wherein the lock pin slides within the lock pin slot.

A method for an automatic fork suppression system for a motorcycle is described. Embodiments of the method include providing a hole in the fork guard, coupling a lock assembly to the fork guard, wherein the lock assembly comprises a body and a latch lever pivotably coupled to the body such that the latch lever is movable between an unlocked position and an armed position, the latch lever coupled to a locking mechanism and having a catch at a first end of the latch lever and a handle at a second end of the latch lever, wherein the lock assembly is coupled to the fork guard such that the fork guard hole allows pass-through of the catch of the lock latch lever, and coupling a fork ring to the upper fork tube, the fork ring having an engagement portion configured to engage with the catch when the latch lever is in the armed position, wherein the coupling includes locating the engagement portion in spaced relationship to the latch lever such that the catch in the armed position engages with the engagement portion when the fork ring moves upwards from a position below the catch.

While the invention herein disclosed has been described by means of specific embodiments, examples and applications thereof, numerous modifications and variations could be made thereto by those skilled in the art without departing from the scope of the invention set forth in the claims.

What is claimed is:

1. An automatic fork suppression system for a motorcycle, comprising:
   a fork ring coupled to a fork tube of the motorcycle; and
   a locking assembly coupled to a fork guard of the motorcycle such that a portion of the locking assembly may pass through the fork guard, whereby the locking assembly is in spaced relationship to the fork ring, the locking assembly comprising:
   a body configured to couple to the fork guard;
   a latch lever movably coupled to the body and including a first end having a handle and a second end having a catch, whereby the latch lever is coupled to the body such that the latch lever is movable between an unlocked position, an armed position, and an engaged position, the spaced relationship further comprising the catch being engaged by an engagement portion of the fork ring when the latch lever is in the armed position and the fork ring moves below the catch and subsequently moves upwards;
   a lever return mechanism configured to automatically restore the latch lever to the unlocked position; and
   a locking mechanism configured to resist the automatic restoring of the latch lever to the unlocked position when the latch lever is in the armed position and comprising a lock pin coupled to the latch lever and the body further comprising at least one lock pin slot, wherein the locking assembly is configured such that at least one end of the lock pin is slidable along each of the at least one lock pin slot, whereby when the latch lever is moved from the unlocked position to the armed position the latch lever is maintained in the armed position prior to engagement by the fork ring.

2. The automatic fork suppression system for the motorcycle of claim 1, wherein:
the body is configured to couple to an outer surface of the fork guard.

3. The automatic fork suppression system for the motorcycle of claim 1, wherein:
the fork ring is configured to encircle the fork tube.

4. The automatic fork suppression system for the motorcycle of claim 1, wherein:
the body includes an interior cavity, and wherein the catch resides entirely within the cavity when the latch lever is in the unlocked position.

5. The automatic fork suppression system for the motorcycle of claim 1, wherein:
the latch lever comprises two parts pivotally coupled together.

6. The automatic fork suppression system for the motorcycle of claim 1, wherein:
the lever return mechanism comprises a first magnet coupled to the body and a second magnet of opposite pole coupled to the latch lever.

7. The automatic fork suppression system for the motorcycle of claim 1, wherein:
the lever return mechanism comprises a coiled spring.

8. The automatic fork suppression system for the motorcycle of claim 1, wherein:
the lever return mechanism comprises a flat spring and a holding pin.

9. The automatic fork suppression system for the motorcycle of claim 1, wherein:
the body includes a cavity and the movable coupling of the latch lever to the body includes a slotted through-hole in the latch lever and a pivot pin spanning the cavity, wherein the latch lever is movably coupled to the body by the pivot pin passing through the slotted through-hole such that at least a portion of the latch lever resides within the cavity.

10. The automatic fork suppression system for the motorcycle of claim 1, wherein:
the resisting of the automatic restoring comprises sliding of the lock pin to a vertical portion of each of the at least one lock pin slot.

11. A method for automatic fork suppression of a motorcycle by an automatic fork suppression system comprising a fork ring fixedly coupled to a fork tube of the motorcycle and a locking assembly with a body fixedly coupled to a fork guard of the motorcycle such that a portion of the locking assembly may pass through the fork guard and such that the locking assembly is in spaced relation to the fork ring, comprising the steps of:
while the fork ring is located above the locking assembly, moving a handle of the locking assembly from an unlocked position to an armed position, whereby a catch of a latch lever of the locking assembly moves from an unlocked position to an armed position;
moving of the fork ring downward past the catch;
subsequent moving of the fork ring upwards, whereby the catch is engaged by the fork ring, whereby further upward movement of the fork tube is suppressed;
subsequent moving of the fork ring downwards, whereby the catch is disengaged by the fork ring; and
automatic returning of the latch lever to the unlocked position as a result of the catch disengaging from the fork ring, wherein the automatic returning is executed by a lever return mechanism of the locking assembly, wherein the locking assembly further includes a locking mechanism to resist an execution of the lever return mechanism prior to the engagement of the catch by the fork ring, the locking mechanism comprising a lock pin coupled to the latch lever and at least one lock pin slot in the body, wherein each lock pin slot of the body receives one end of the lock pin, wherein the lock pin slides within each of the at least one lock pin slot.

12. The method for automatic fork suppression of the motorcycle of claim 11, further comprising:
the unlocked position including the catch being contained within a cavity of a body of the locking mechanism.

13. The method for automatic fork suppression of the motorcycle of claim 12, wherein:
the moving of the catch from the unlocked position to the armed position includes the catch exiting the cavity towards the fork tube.

14. The method for automatic fork suppression of the motorcycle of claim 11, wherein:
the body is configured to couple to an outer surface of the fork guard.

15. The method for automatic fork suppression of the motorcycle of claim 11, wherein:
the lever return mechanism comprises a spring coupled to the latch lever.

16. A method for installing an automatic fork suppression system on a motorcycle having a fork comprising a lower fork tube coupled to and sharing a longitudinal axis with an upper fork tube, wherein the upper fork tube is configured to move relative to the lower fork tube along the longitudinal axis, the motorcycle further comprising a fork guard coupled to the lower fork tube, comprising the steps of:
providing a hole in the fork guard;
coupling a locking assembly to the fork guard, wherein the locking assembly comprises:
a body;
a latch lever pivotably coupled to the body such that the latch lever is movable between an unlocked position and an armed position, the latch lever having a catch at a first end of the latch lever and a handle at a second end of the latch lever; and
a locking mechanism coupled to the latch lever and comprising a lock pin coupled to the latch lever, and the body further comprising at least one lock pin slot, wherein the locking assembly is configured such that at least one end of the lock pin is slidable along each of the at least one lock pin slot, wherein the locking assembly is coupled to the fork guard such that the fork guard hole allows pass-through of the catch of the latch lever; and
coupling a fork ring to the upper fork tube, the fork ring having an engagement portion configured to engage with the catch when the latch lever is in the armed position, wherein the coupling includes locating the engagement portion in spaced relationship to the latch lever such that the catch in the armed position engages with the engagement portion when the fork ring moves upwards from a position below the catch.

* * * * *